(12) United States Patent
Yamamoto et al.

(10) Patent No.: US 7,928,926 B2
(45) Date of Patent: Apr. 19, 2011

(54) DISPLAY APPARATUS AND METHOD FOR HANDS FREE OPERATION THAT SELECTS A FUNCTION WHEN WINDOW IS WITHIN FIELD OF VIEW

(75) Inventors: Kakuya Yamamoto, Hyogo (JP); Hideaki Nakaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 762 days.

(21) Appl. No.: 11/812,012

(22) Filed: Jun. 14, 2007

(65) Prior Publication Data

US 2007/0296646 A1    Dec. 27, 2007

(30) Foreign Application Priority Data

Jun. 27, 2006  (JP) ................................. 2006-176943

(51) Int. Cl.
  *G09G 5/00*       (2006.01)
(52) U.S. Cl. ............................................................. 345/8
(58) Field of Classification Search .................. 345/7–9, 345/156–184; 473/56; 341/121, 21; 382/114; 348/115
  See application file for complete search history.

(56) References Cited

U.S. PATENT DOCUMENTS

| | | | |
|---|---|---|---|
| 5,850,211 A * | 12/1998 | Tognazzini | 345/158 |
| 5,977,935 A * | 11/1999 | Yasukawa et al. | 345/8 |
| 6,184,847 B1 * | 2/2001 | Fateh et al. | 345/8 |
| 6,456,262 B1 * | 9/2002 | Bell | 345/8 |
| 7,453,451 B1 * | 11/2008 | Maguire, Jr. | 345/205 |
| 2003/0067476 A1 * | 4/2003 | Miller et al. | 345/598 |
| 2005/0210418 A1 * | 9/2005 | Marvit et al. | 715/863 |

FOREIGN PATENT DOCUMENTS

| | | |
|---|---|---|
| JP | 7-024141 | 1/1995 |
| JP | 8-286141 | 11/1996 |

\* cited by examiner

*Primary Examiner* — Alexander S Beck
*Assistant Examiner* — Liliana Cerullo
(74) *Attorney, Agent, or Firm* — Wenderoth, Lind & Ponack, L.L.P.

(57) ABSTRACT

The present invention provides a display apparatus which enables high-accuracy, hands-free operation, while adopting a low-cost configuration. The display apparatus according to the present invention includes: an obtainment unit that obtains a display element which is information to be displayed to the user; a determining unit that determines a display position of the obtained display element, at which a portion of the obtained display element can not be seen by the user; a display unit that displays the display element at the determined display position; a detection unit that detects a direction of change when an orientation of the user's head is changed; a selection unit that selects the display element to be displayed in the detected direction of change; and an execution unit that executes a predetermined process related to the selected display element.

15 Claims, 19 Drawing Sheets

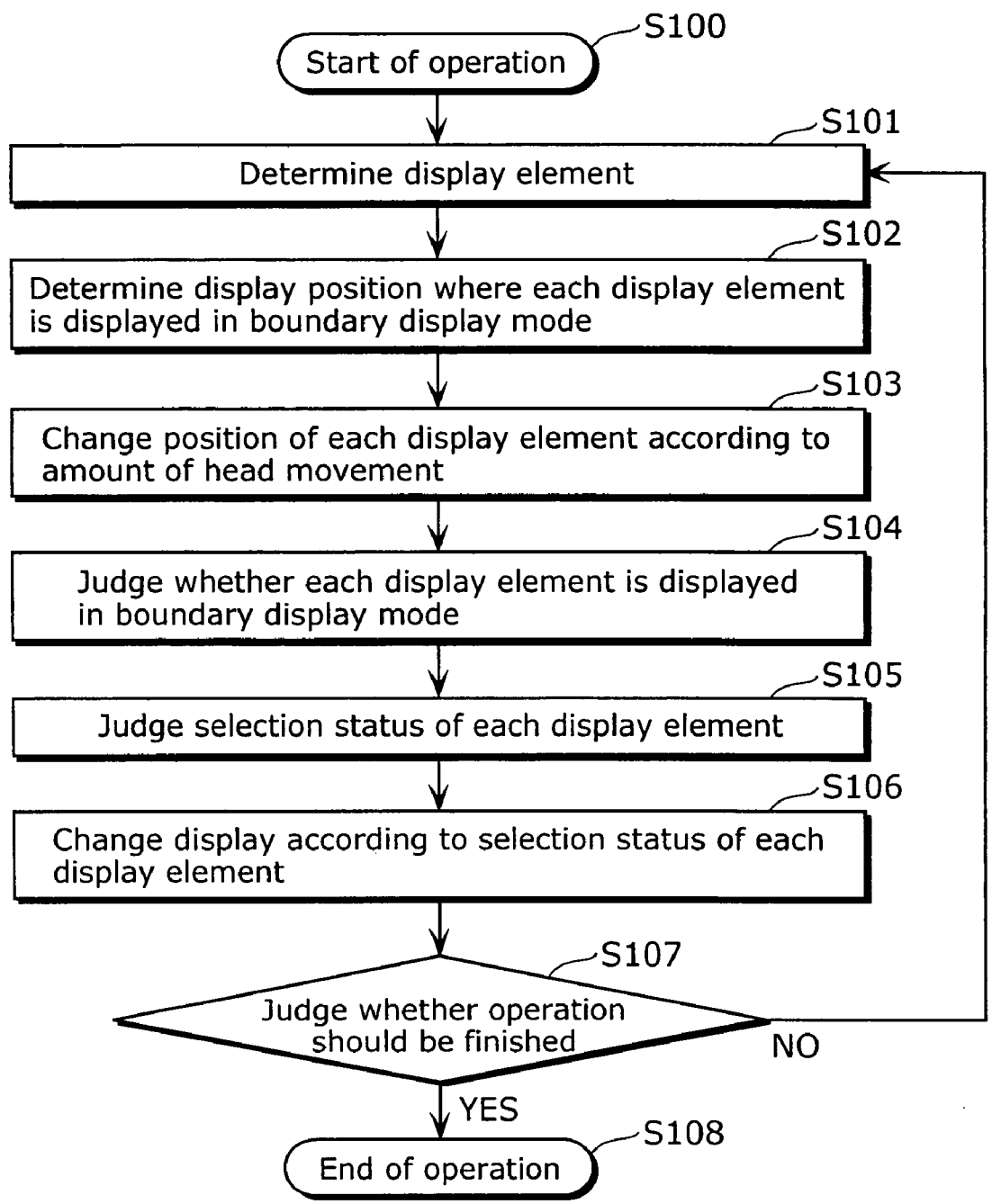

| Display element | Display size | Display position | Boundary display status | Selection status |
|---|---|---|---|---|
| Display element 1 | (40, 30) | (-10, 0) | Boundary display | Non-selected |
| Display element 2 | (40, 30) | (70, 0) | Boundary display | Non-selected |
| Display element 3 | (40, 30) | (-10, 50) | Boundary display | Non-selected |
| Display element 4 | (40, 30) | (70, 50) | Boundary display | Non-selected |

| Display element | Display size | Display position | Boundary display status | Selection status |
|---|---|---|---|---|
| Display element 1 | (40, 30) | (0, 0) | Full display | Selected |
| Display element 2 | (40, 30) | (80, 0) | Boundary display | Non-selected |
| Display element 3 | (40, 30) | (0, 50) | Boundary display | Non-selected |
| Display element 4 | (40, 30) | (80, 50) | Boundary display | Non-selected |

| Display element | Display size | Display position | Boundary display status | Selection status |
|---|---|---|---|---|
| Display element 1 | (40, 30) | (-20, -10) | Boundary display | Non-selected |
| Display element 2 | (40, 30) | (60, -10) | Boundary display | Non-selected |
| Display element 3 | (40, 30) | (-20, 40) | Boundary display | Non-selected |
| Display element 4 | (40, 30) | (60, 40) | Full display | Selected |

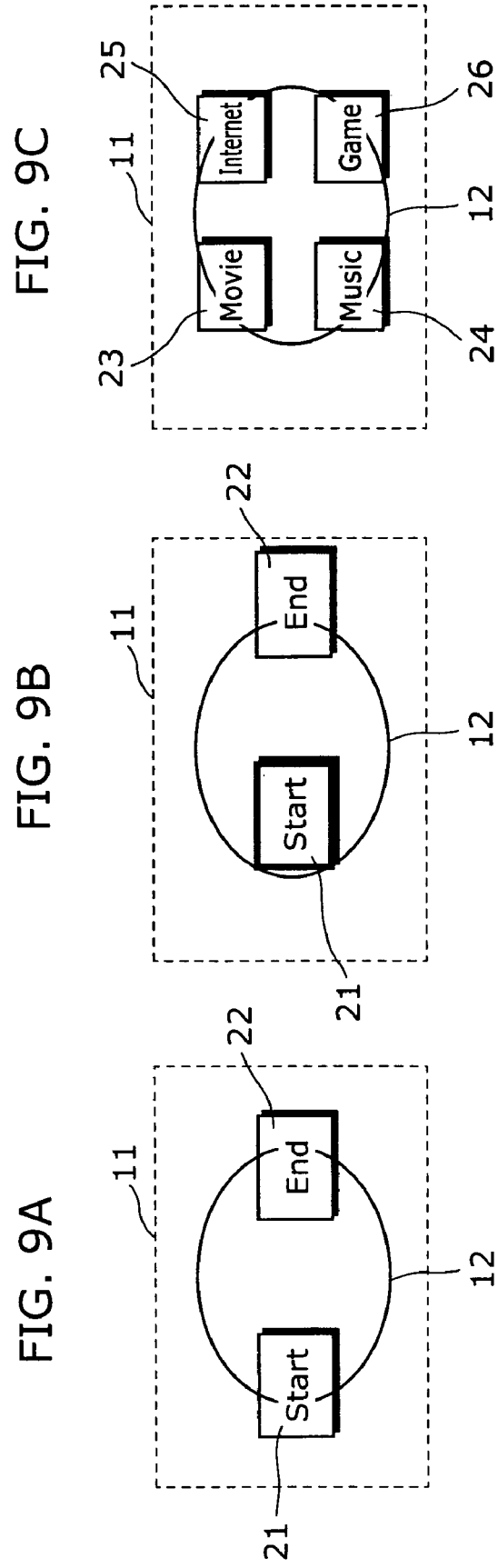

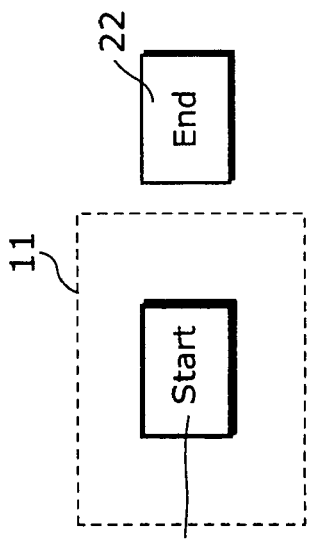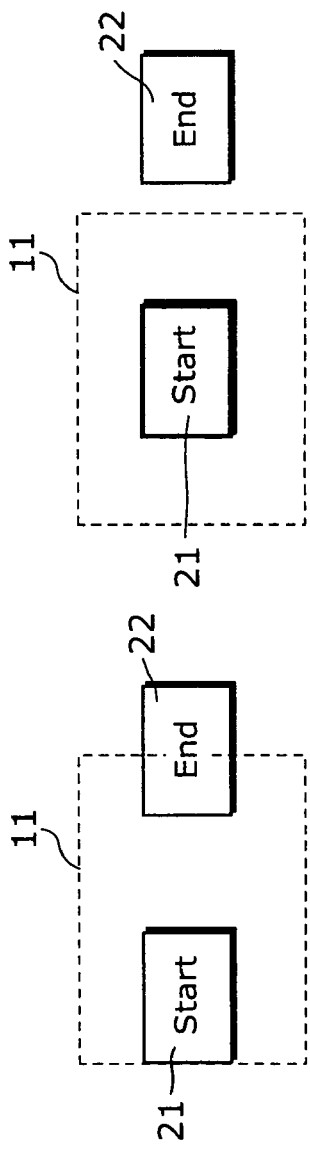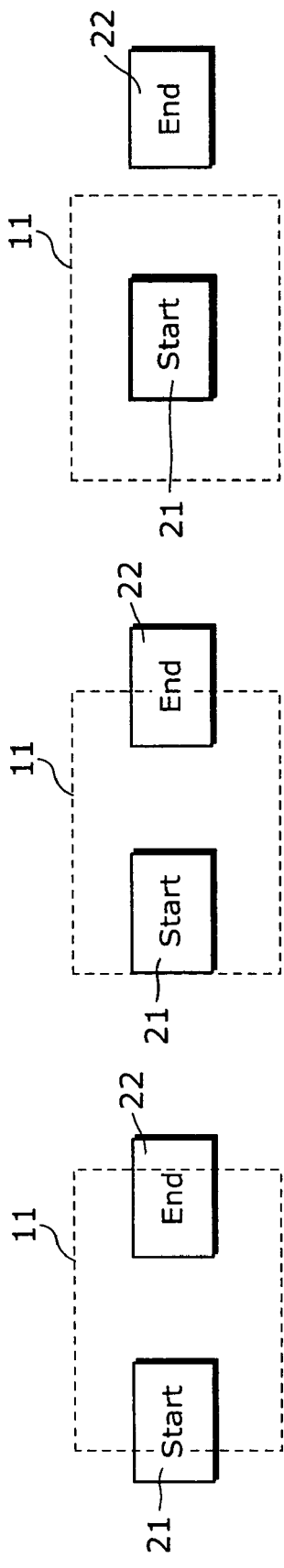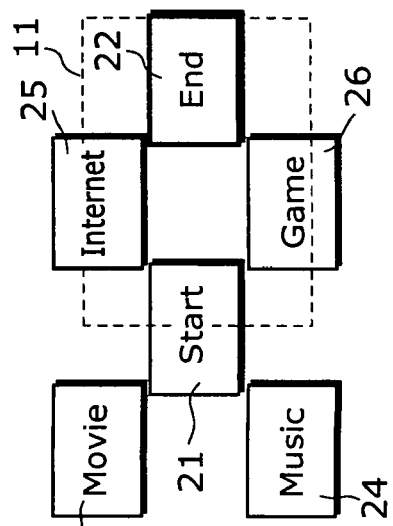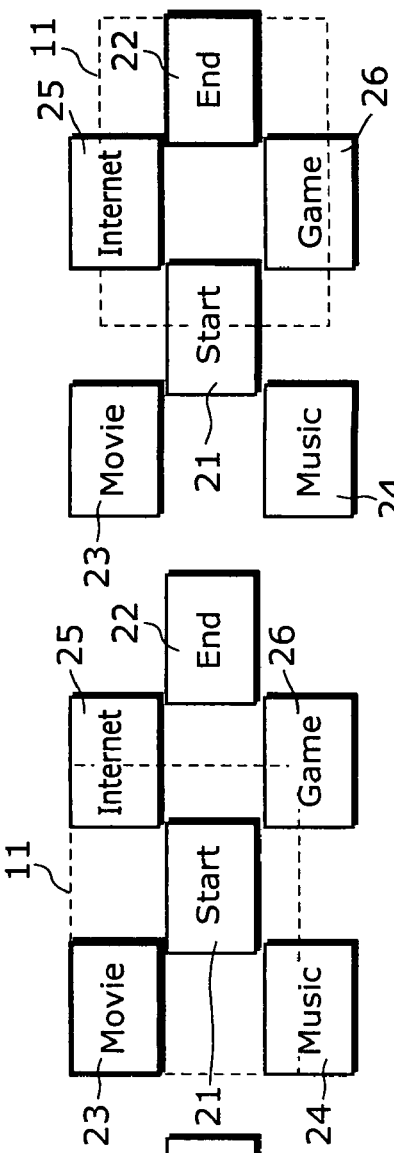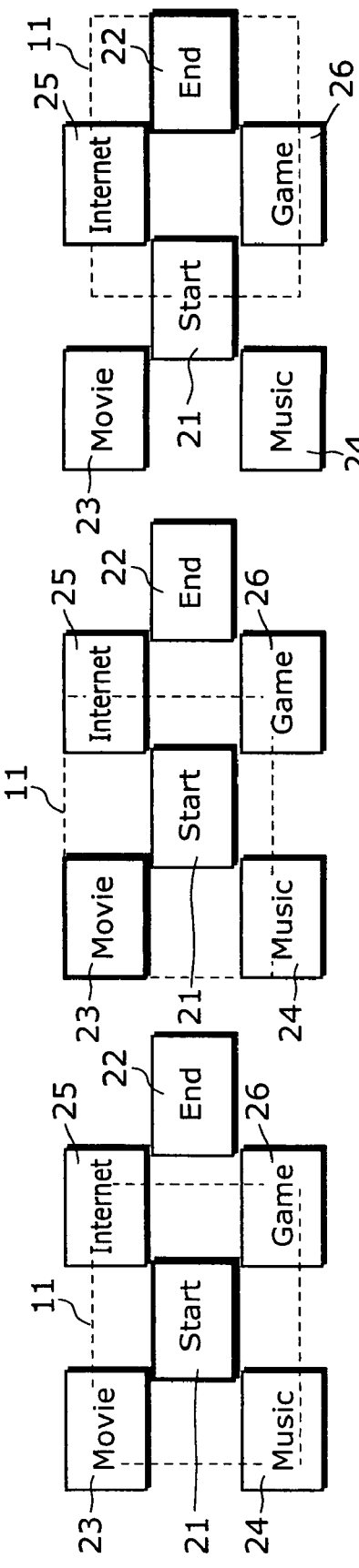

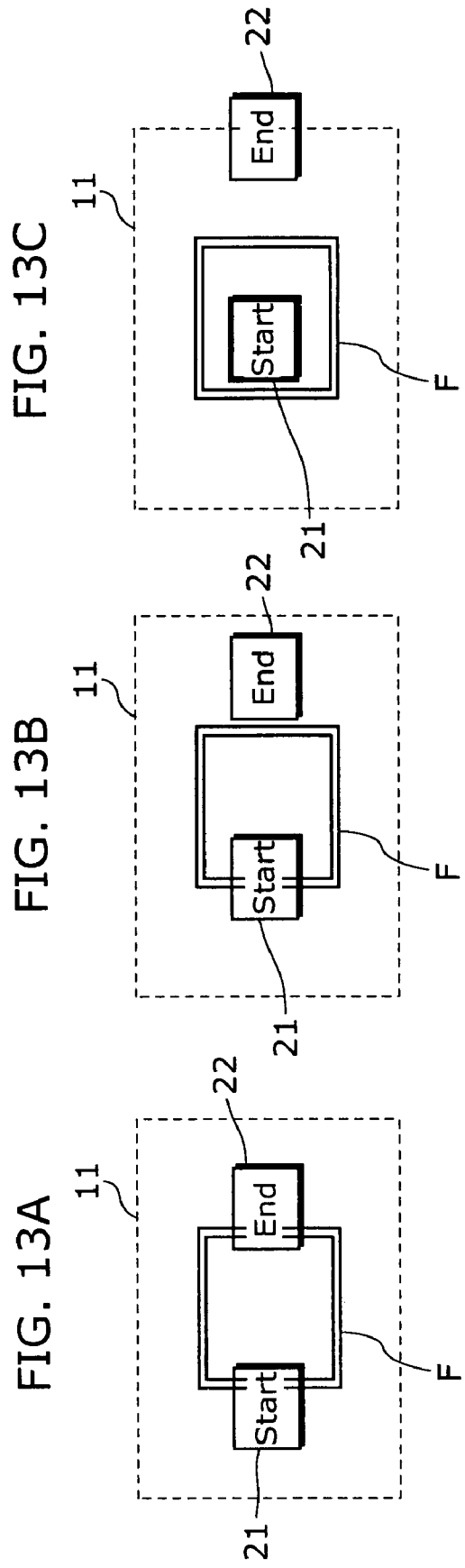

FIG. 19A
FIG. 19B
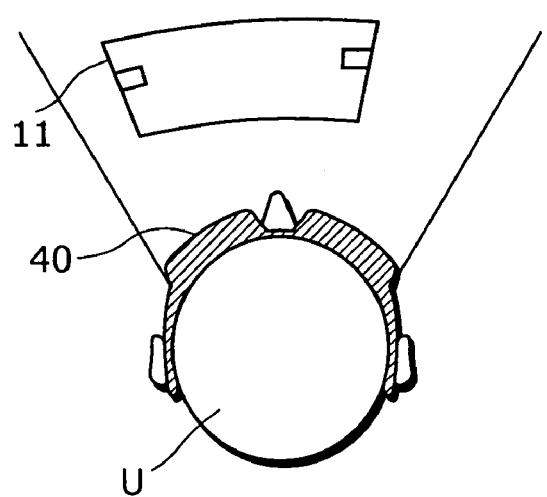
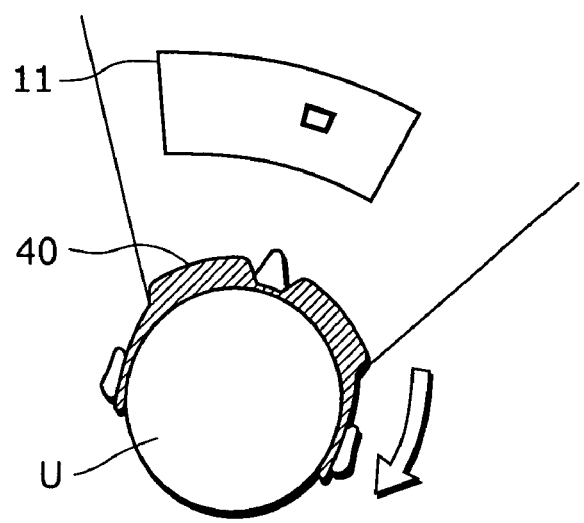

DISPLAY APPARATUS AND METHOD FOR HANDS FREE OPERATION THAT SELECTS A FUNCTION WHEN WINDOW IS WITHIN FIELD OF VIEW

BACKGROUND OF THE INVENTION (1) Field of the Invention

The present invention relates to a display apparatus which displays information, and in particular to a hands-free operation technique for head-worn displays such as HMDs (head-mounted displays).

(2) Description of the Related Art

Conventionally, hands-free operation methods which eliminate the need for manual user operation have been proposed for head-worn displays such as HMDs (head-mounted displays). Typical hands-free operation methods include a method which uses an eye camera (camera which takes images of eyeballs).

For example, there is a method which estimates a user's point of regard by taking images of the user's eyeballs with an eye camera and analyzing their moving images (e.g., refer to Japanese Unexamined Patent Application Publication No. 8-286141). This method makes it possible to estimate a display element watched by the user out of multiple display elements displayed on a screen of an HMD or the like. This allows the user to operate the HMD by moving the line of sight without button operation or the like.

Also, there are methods for estimating a direction user is looking in, using something other than an eye camera.

For example, there is a method which estimates the direction user is looking in, based on output from an angular velocity sensor mounted on the head of the user (e.g., refer to Japanese Unexamined Patent Application Publication No. 7-24141). This method makes it possible to estimate, to some extent, an area the user is looking at.

SUMMARY OF THE INVENTION

Methods for finding, in this way, the display element watched by the user out of multiple display elements displayed on the screen of an HMD include one which uses an eye camera and one which uses an angular velocity sensor. When the two methods are compared, the method which uses an eye camera has a problem in that it involves high hardware costs for the eye camera and a light source as well as high computing costs for image processing used to estimate the point of regard. On the other hand, the method which uses an angular velocity sensor has a problem in that it has a relatively low accuracy in estimating the direction user is looking in although it has the advantage of involving relatively low hardware costs and computing costs. The reason for the low accuracy is that when the user moves only his/her eyeballs without moving his/her head, the angular velocity sensor cannot detect the eyeball movements. In this way, the method which uses an angular velocity sensor has a problem in that it cannot accurately find the display element watched by the user out of multiple display elements displayed on the screen of an HMD.

In order to overcome the aforementioned problem, an object of the present invention is to provide a display apparatus which enables high-accuracy hands-free operation while adopting a low-cost configuration.

In order to solve the aforementioned conventional problems, the display apparatus according to the present invention is a display apparatus which displays information to a user and which includes an obtainment unit that obtains a display element which is information to be displayed to the user; a determining unit that determines a display position of the obtained display element, at which a portion of the obtained display element can not be seen by the user; a display unit that displays the display element at the determined display position; a detection unit that detects a direction of change when an orientation of the user's head is changed; a selection unit that selects the display element to be displayed in the detected direction of change; and an execution unit that executes a predetermined process related to the selected display element.

With this configuration, since the user cannot see part of the display elements, when the user looks at a display element, the user's head moves automatically. Consequently, the display element displayed in the direction of head orientation change is selected and a predetermined process related to the selected display element is executed. This enables high-accuracy hands-free operation while adopting a low-cost configuration which only needs to detect the direction of head orientation change.

Here, the display apparatus further includes a changing unit that changes the display position of the display element so that the display element moves in a direction approximately opposite to the detected direction of change, wherein it is possible that the display unit displays the display element at the changed display position.

With this configuration, for example, when the user moves his/her head to the right to look at a display element displayed on the right, the display element moves to the left, and when the user directs his/her head to the front, the user can watch contents of the display element. This makes it possible to reduce selection mistakes.

Furthermore, it is possible that the selection unit selects the display element when the entire display element is brought into view of the user.

With this configuration, since a display element is not selected unless the user moves his/her head until the user can see the entire display element, it is possible to select only a display element when the user tries to see the entire display element.

Furthermore, it is possible that the selection unit selects the display element when a predetermined percentage or more of the display element is brought into view of the user.

With this configuration, since a display element is not selected unless the user moves his/her head until the user can see a predetermined percentage or more (most part) of the display element, it is possible to select only a display element most part of which the user tries to look at.

Furthermore, it is possible that the selection unit selects the display element when a predetermined display condition continues for a predetermined time or longer.

With this configuration, since a display element is not selected until a predetermined display condition continues for a predetermined time or longer, any display element at which the user takes only a quick glance is not selected. This makes it possible to reduce selection mistakes.

Furthermore, it is possible that the determination unit determines the display position of the display element such that the display element crosses a boundary line of a visual field of the user.

With this configuration, if the display area of the display unit is larger than the visual field of the user, since the display element is displayed across the boundary line of the user's visual field, it is possible to hide part of the display element from the view of the user.

Furthermore, it is possible that the determination unit determines the display position of the display element such that the display element crosses a boundary line of a display area of the display unit.

With this configuration, if the display area of the display unit is smaller than the visual field of the user, since the display element is displayed across the boundary line of the display area of the display unit, it is possible to hide part of the display element from the view of the user.

Furthermore, it is possible that the determination unit determines the display position of the display element such that: part of a right end of the display element is displayed at a left end of a display area of the display unit; that part of a left end of the display element is displayed at a right end of the display area of the display unit, that part of a lower end of the display element is displayed at an upper end of the display area of the display unit; or that part of an upper end of the display element is displayed at a lower end of the display area of the display unit.

With this configuration, part of the display element can be hidden easily from the view of the user on a typical rectangular display screen.

Furthermore, the display apparatus further includes a changing unit that changes the display position of the display element so that the display element moves in a direction approximately opposite to the detected direction of change, wherein even when display positions of a plurality of display elements are changed, it is possible that the determination unit determines the display positions of the plurality of display elements so that one of the display elements is selected.

With this configuration, since only one display element is displayed in full display mode, the user can reliably select one display element he/she desires out of multiple display elements.

Furthermore, it is possible that the detection unit detects the direction of change based on output from an angular velocity sensor mounted on the head of the user.

With this configuration, all that is necessary is to detect the direction of head orientation change based on the output from the angular velocity sensor. This eliminates the need for an expensive eye camera or image processing costs required to recognize the point of regard in a moving image shot by an eye camera, and thereby makes it possible to drastically reduce overall cost.

Furthermore, it is possible that when the display element is a button, the execution unit executes a process assigned to the button.

With this configuration, when the user watches the button, a process assigned to the button is executed, making it possible to specify a press of the button in a hands-free manner.

Furthermore, it is possible that when the display element is a moving image, the execution unit starts playing back the moving image.

With this configuration, when the user watches the moving image, the moving image starts to be played back, making it possible to start playing back the moving image in a hands-free manner.

Furthermore, it is possible that the display unit displays a selection frame, which is a frame used to select the display element, at a predetermined display position, and the selection unit selects the display element when the display element fits in the selection frame.

With this configuration, a display element can be selected using a selection frame which is an easy-to-understand means. This has the effect of improving ease of use.

Furthermore, it is possible that the display unit is mounted on the head of the user.

With this configuration, the present invention can be applied to HMDs.

Incidentally, the present invention can be implemented not only as a display apparatus such as described above, but also as an integrated circuit equipped with characteristic means such an apparatus has, as a display apparatus control method which includes steps corresponding to the characteristic means such an apparatus has, or as a program which makes a computer execute the steps. Besides, needless to say, such a program can be distributed via a recording medium such as a CD-ROM or via a transmission medium such as the Internet.

As can be seen from the above description, with the display apparatus according to the present invention, since the user cannot see part of a display element, when the user looks at the display element, the user's head moves automatically. Consequently, the display element displayed in the direction of head orientation change is selected and a predetermined process related to the selected display element is executed. This enables high-accuracy, hands-free operation while adopting a low-cost configuration which only needs to detect the direction of head orientation change.

Further Information about Technical Background to this Application

The disclosure of Japanese Patent Application No. 2006-176943 filed on Jun. 27, 2006 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 3 is a diagram showing operation of the display apparatus according to the first embodiment of the present invention;

FIG. 4A is a diagram showing a display example according to the first embodiment of the present invention while FIG. 4B is a diagram showing a display position management table according to the first embodiment of the present invention;

FIG. 5A is a diagram showing a display example according to the first embodiment of the present invention while FIG. 5B is a diagram showing a display position management table according to the first embodiment of the present invention;

FIG. 6A is a diagram showing a display example according to the first embodiment of the present invention while FIG. 6B is a diagram showing a display position management table according to the first embodiment of the present invention;

FIGS. 9A to 9C are diagrams showing another state transition on the display unit according to the first embodiment of the present invention;

FIGS. 12A to 12F are diagrams showing another state transition on the display unit according to the first embodiment of the present invention;

FIGS. 13A to 13C are diagrams showing a display example when a selection frame is provided;

FIGS. 19A and 19B are diagrams conceptually showing a display area visible to a user wearing an HMD.

DESCRIPTION OF THE PREFERRED EMBODIMENTS

Embodiments of the present invention will be described below with reference to the drawings.

First Embodiment

Figure 1:
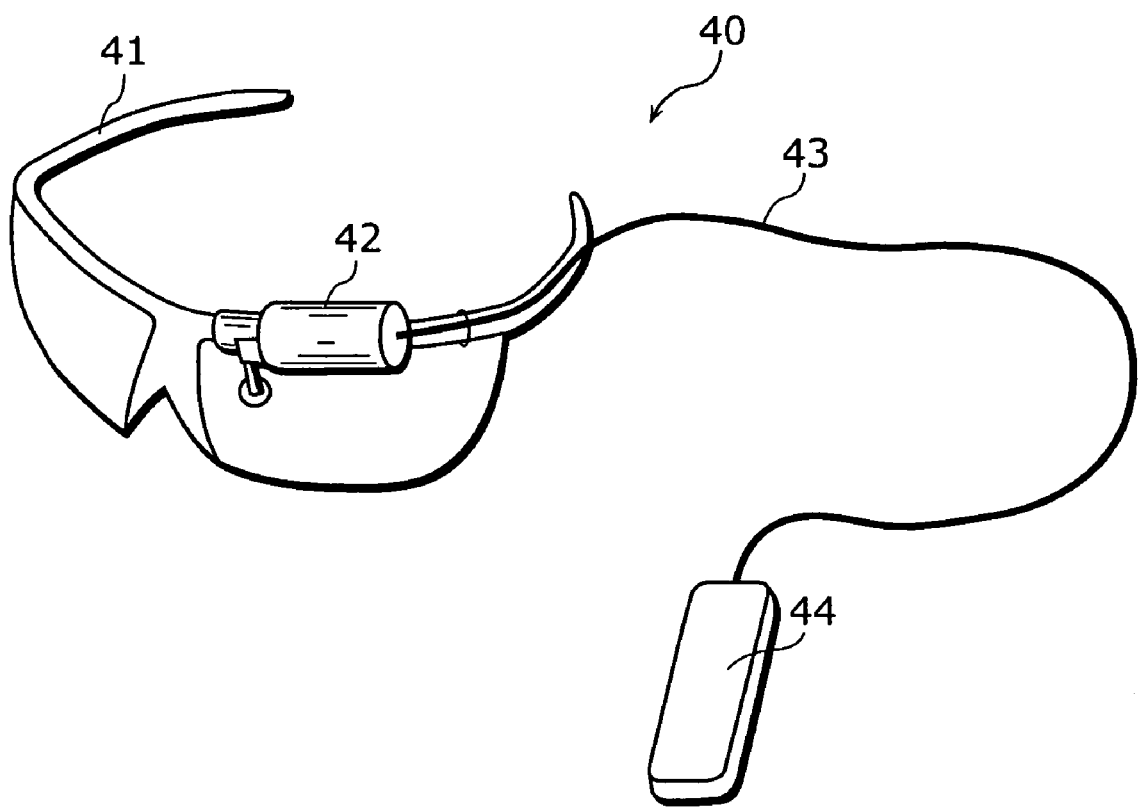
FIG. 1 is an external view of a display apparatus according to a first embodiment of the present invention.

FIG. 1 is an external view of a display apparatus according to a first embodiment of the present invention. The first embodiment illustrates an example in which an HMD 40 is used as a display apparatus.

The HMD 40 is a display apparatus mounted on the head of a user. As shown in the figure, it consists of ordinary glasses 41 on which a small projector 42 is mounted. Image data, power, and the like are sent to the projector 42 from a main body 44 via a cable 43. The image data sent to the projector 42 is projected onto a display prism mounted along lenses of the glasses 41 at a viewing angle of around 27.

When no image data is projected, the user can see scenery around him/her routinely through the glasses. On the other hand, when image data is projected, the projected image is seen floating in the scenery.

Figure 2:
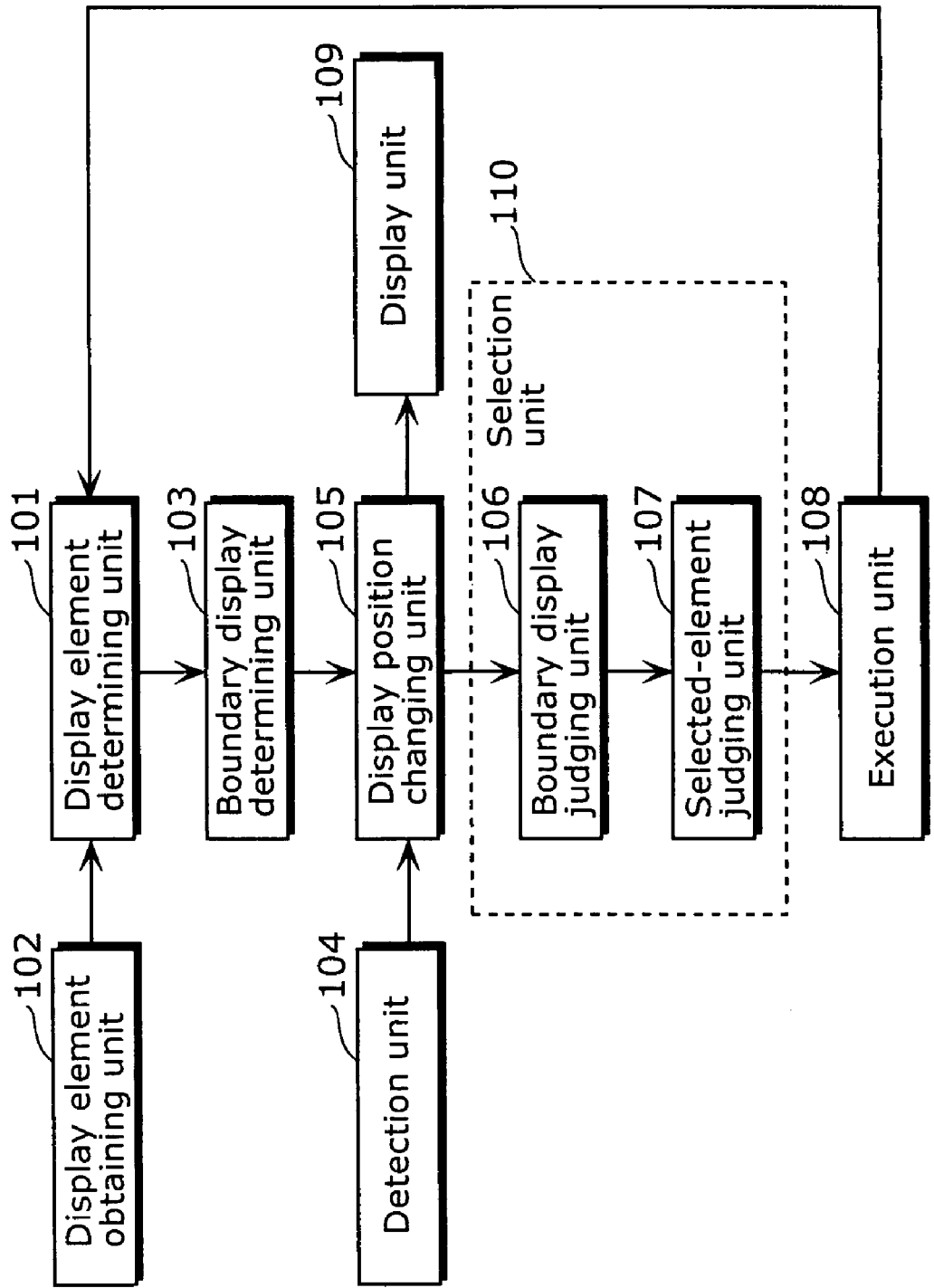
FIG. 2 is a block diagram of the display apparatus according to the first embodiment of the present invention.

FIG. 2 is a block diagram of the display apparatus according to the first embodiment of the present invention. The display apparatus is one (e.g., HMD 40) mounted on the head of a user. Functionally, it includes a display element determining unit 101, display element obtaining unit 102, boundary display determining unit 103, detection unit 104, display position changing unit 105, selection unit 110, execution unit 108, and display unit 109. The selection unit 110 includes a boundary display judging unit 106 and selected-element judging unit 107.

Components and their relationships will be described below with reference to the block diagram in FIG. 2.

The display element determining unit 101 determines display elements. The display elements are components of information displayed to the user. They include GUI (graphical user interface) parts such as icons, buttons, and windows as well as content such as moving images, still images, characters, and symbols. Also, information such as voice information which is not displayed to the user may be combined with display elements. The display elements may be TV programs, mail, homepages, clocks, time tables, stock prices, signs, characters, or advertisements and commercials. The number of display elements determined to be displayed may be either one or more than one.

The display element obtaining unit 102, which is an example of the obtaining unit according to the present invention, obtains the display element determined by the display element determining unit 101. Regarding a method for obtaining the display element, it may be obtained via a wired or wireless communications channel or broadcasting channel or obtained via an optical disk or semiconductor memory. Also, display elements may be obtained prior to a determination by the display element determining unit 101. When obtaining two or more display elements, they may be obtained either all at once or one by one.

The boundary display determining unit 103, which is an example of the determining unit according to the present invention, determines a display position of the display element obtained by the display element obtaining unit 102 in such a way that the user cannot see part of the display element. Specifically, since the display element determining unit 101 comes between the display element obtaining unit 102 and boundary display determining unit 103, the boundary display determining unit 103 determines such a display position at which the user cannot see part of the display element determined by the display element determining unit 101. Displaying a display element at a display position where the user cannot see part of the display element is referred to herein as "boundary display mode". In other words, the boundary display mode involves displaying a display element in such a way that the user can see part of the display element, but cannot see the remaining part of the display element. For example, by displaying only the left half of the display element at the right end of an HMD screen or displaying only upper part of the display element at the lower end of the screen, it is possible to show the user part of the display element, but not all of the display element. On the other hand, displaying a display element at a display position where the user can see the entire display element is referred to as "full display mode".

Incidentally, if there are two or more display elements, the boundary display determining unit 103 determines the display positions of the display elements in such a way that at least one of the display elements will be displayed in boundary display mode. That is, not all display elements have to be displayed in boundary display mode. For example, if there are two display elements, their positions may be determined in such a way that only one of them will be displayed in boundary display mode. Alternatively, one of them may be displayed in boundary display mode at the left end of the HMD screen and the other may be displayed in full display mode near the right end of the screen. Also, if there are multiple display elements, their display positions may be determined in such a way that only one of them will be displayed in full display mode with the rest being displayed in boundary display mode. This simplifies processes of the selected-element judging unit 107 described later when the user is allowed to select one display elements eventually.

Incidentally, a display range of the HMD (display area of the display unit 109) does not have to be rectangular. For example, the upper edge of the HMD screen may be a curve or polygonal line with its middle section recessed instead of a straight horizontal line. Also, boundary display may be achieved by hiding part of a display element by another display element displayed in front of it.

Incidentally, if the display range of the HMD is larger than the user's visual field, the display element may cross a boundary line of the user's visual field. This can achieve boundary display as in the case where the display element crosses the boundary line of the display area of the display unit 109. The boundary line of the visual field here may be a boundary line of a binocular visual field or a boundary line of a monocular visual field. For example, available boundary lines of the binocular visual field include boundary lines within a visual field ranging up to 60 degrees to the left and right, 60 degrees upward, and 75 degrees downward from the front of the face. Also, available boundary lines of the monocular visual field include boundary lines within a visual field ranging up to 100 degrees to the left and right, 60 degrees upward, and 75 degrees downward from the front of the face. Considering individual differences in the visual field range, the specific angles cited here may vary by up to 20 degrees.

Incidentally, the "visual field" described above mainly means a peripheral visual field, but boundary lines may be determined for a central visual field instead of the peripheral visual field. That is human visual fields can be roughly divided into central visual field and peripheral visual field. In the central visual field, shape of an object can be discriminated in detail and colors can be recognized. On the other hand, in the peripheral visual field, the shape of an object is vague and colors are indistinct. When a display element is placed across a boundary line of the user's central visual field, the user can see part of the display element vaguely. Consequently, the head of the user tends strongly to move automatically in an attempt to see details of the entire display element.

The detection unit 104, which is an example of the detection unit according to the present invention, detects an amount of movement of the user's head. The amount of movement of the user's head can be detected based on output from an angular velocity sensor mounted on the head of the user (angular velocity sensor mounted on the display apparatus). An acceleration sensor, geomagnetic sensor, radio sensor, or ultrasonic sensor may be used instead of the angular velocity sensor. Also, a camera, sensor, electronic tag reader, or the like which is not mounted on the head may be used as long as it can detect movements of the head. A semiconductor sensor which uses a semiconductor element may also be adopted. The amount of movement of the user's head may be angular changes, an amount of travel, or amount of their acceleration. A flag which indicates whether the user's head has moved to the left or right may also be regarded as the amount of head movement. That is, the amount of head travel may be any value that allows the direction of head orientation change to be detected.

The "head orientation" is the direction in which the head is oriented with respect to the body and the "direction of head orientation change" is the direction in which the head orientation changes. For example, when the head looking straight ahead is turned to the left, a "leftward" direction of change is detected and when the head facing left is turned back to the original front, and a "rightward" direction of change is detected.

The display position changing unit 105, which is an example of the changing unit according to the present invention, changes the display position of the display element, according to the amount of head movement detected by the detection unit 104, in such a way that the display element moves in a direction approximately opposite to the direction of head orientation change. Consequently, when the user's head moves, for example, to the right, the display on the HMD moves to the left. The phrase "direction approximately opposite" is used here because it is not necessary that the directions should be completely opposite (180-degree opposite directions). That is, when the display element moves in a direction at an angle of 90 to 270 degrees (both inclusive) with respect to the direction of head orientation change, it is considered that the display element has moved in a direction approximately opposite to the direction of head orientation change.

The method for moving the display element to the left is not limited to the one which moves the display position without changing the display size or shape of the display element. For example, available methods include one which moves the left end position of the display element leftward or right end position of the display element rightward by scaling the display size or changing the shape of the display element. The same applies to rightward shifts and vertical shifts.

The selection unit 110, which is an example of the selection unit according to the present invention, selects the display element displayed in the direction of head orientation change detected by the detection unit 104. For example, it selects any display element whose display position changes to where the user can see the entire display element. To accomplish such a selection process, the selection unit 110 performs a boundary display judging process and selected-element judging process. Hereinafter, the selection unit 110 which performs the boundary display judging process will be called a "boundary display judging unit 106" and the selection unit 110 which performs the selected-element judging process will be called a selected-element judging unit 107".

The boundary display judging unit 106 judges the boundary display status of the display element whose display position has been changed by the display position changing unit 105. The boundary display status indicates whether a display element is displayed in boundary display mode. It may be two-valued: "boundary display" and "full display". Alternatively, the value of the boundary display status may represent the percentage of displayed part. Besides, it is not that one display element can have only one boundary display status. For example, each display element may be divided into multiple areas, and the boundary display status of each of the areas may be judged. Also, the past boundary display status and the future boundary display status (predicted value) of each display element may be judged.

The selected-element judging unit 107 judges the selection statuses of display elements based on the boundary display statuses judged by the boundary display judging unit 106. For example, it judges any display element displayed in full display mode as being "selected", and any display element displayed in boundary display mode as being "non-selected". Any display element most part of which is displayed can be judged as being "selected". Alternatively, another judgment criterion may be adopted. Also, multiple display elements may be selected instead of a single display element. The selection status indicates whether a display element is selected by the user. It may be two-valued: "selected" and "non-selected". Alternatively, the value of the selection status may represent the extent to which the display element is selected or the likelihood that the display element is selected. The display element thus judged by the selected-element judging unit 107 as being "selected" can be said to be a display element selected by the selection unit 110.

The execution unit 108, which is an example of the execution unit according to the present invention, executes a predetermined process related to the display element selected by the selection unit 110 (i.e., the display element judged by the selected-element judging unit 107 as being "selected"). The predetermined process as referred to herein can be any of various processes and is not specifically limited, but typically it means the process of making changes in display operation for the display element. The changes in display operation include changes in display size, shape, position, color, brightness, and depth as well as changes in contents, changes in a playback status, and changes in presence or absence of display. Besides, the absence of such changes will also be regarded as a form of making changes in display operation. Also, in addition to making changes in the display operation for the display element itself, changes may be made in display operation for information other than the display element, such as displaying a frame around the display element.

The display unit 109, which is an example of the execution unit according to the present invention, displays a display element at the display position determined by the display element determining unit 101 or the display position changed by the display position changing unit 105. Also, it displays results of processing executed by the execution unit 108. Specifically, a display unit of an HMD, FMD (face-mounted display), HUD (head-up display), glass type display, or the like corresponds to the display unit 109 described herein. The display unit 109 may be mounted on the front, sides, or back of the head, nose, ears, forehead, face, hair, mouse, or other part of the head. Also, it may be mounted on the upper half of the body such as the neck, shoulders, chest, or back. A display type may be a display/projection type which uses a translucent liquid crystal, reflective liquid crystal, or organic EL (electroluminescent) element or a display/projection type which uses optical semiconductors or laser.

The components in FIG. 2 may or may not be incorporated in a single HMD. For example, all the components in FIG. 2 may be incorporated in a single HMD or the display element obtaining unit 102 may be installed in another apparatus. Alternatively, the components may be distributed on multiple apparatus. For example, the detection unit 104 and display unit 109 may be installed in different apparatus. Also, there may be multiple units of each component. For example, there may be two display units 109. Also, each component in FIG. 2 may be shared among multiple users.

Next, operation will be described.

FIG. 3 is a diagram showing operation of the display apparatus according to the first embodiment of the present invention. In the following description, it is assumed that four moving images (which will be referred to as "display element 1", "display element 2", "display element 3", and "display element 4", respectively) are displayed all at once as four display elements on an HMD. Specifically, in the operation described below, it is assumed that, of the four moving images being displayed, one moving image being watched by the user is in a playback state while the other three moving images which are not being watched by the user are in a pause state.

(S100) Operation is started. Then, the flow goes to operation in S101.

(S101) The display element determining unit 101 determines the display elements to be displayed on the display unit 109 and the display element obtaining unit 102 obtains the display elements determined by the display element determining unit 101. Then, the flow goes to operation in S102. In this description, it is assumed that four display elements—display element 1, display element 2, display element 3, and display element 4—are determined by the display element determining unit 101. Incidentally, available decision criteria include: user preferences; fitness for a purpose; fitness for user conditions such as surrounding conditions, body conditions, psychological conditions, social conditions, and interpersonal conditions of the user; equipment characteristics such as display characteristics of the HMD, communications characteristics of the display element obtaining unit 102 or communications channel, and information storage characteristics.

(S102) The boundary display determining unit 103 determines the display position at which each display element is displayed in boundary display mode. Then, the flow goes to operation in S103. The display positions of the display elements are determined by comparing the display range of the HMD with the display sizes of the display elements.

Figures 4A, 4B:
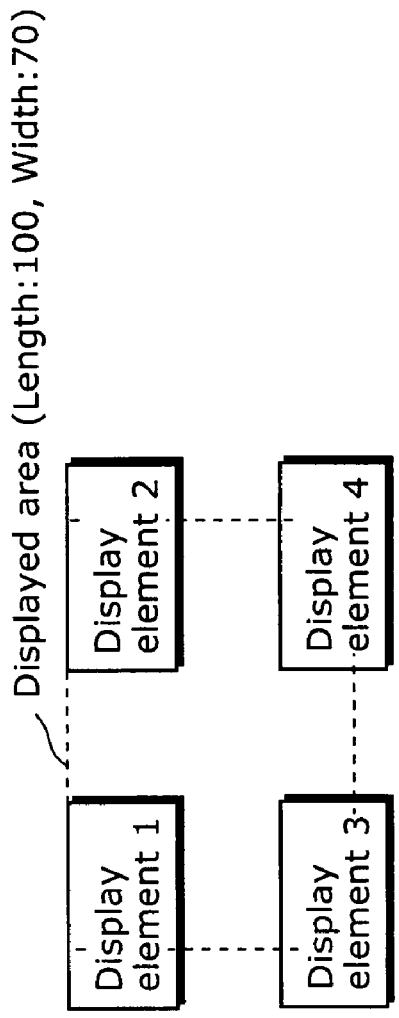

FIG. 4A is a diagram showing a display example according to the first embodiment of the present invention and FIG. 4B is a diagram showing a display position management table 10 according to the first embodiment of the present invention. The display position management table 10 manages "display size", "display position", "boundary display status", and "selection status" of individual display elements. It is referred to and updated by the boundary display determining unit 103, the display position changing unit 105, the boundary display judging unit 106, selected-element judging unit 107, and execution unit 108. In this description, it is assumed that the display range of the HMD is rectangular, measuring 100 pixels long and 70 pixels wide. On the other hand, it is assumed that each display element is also rectangular, measuring 40 pixels long and 30 pixels wide. Based on the display range of the HMD and display sizes of the display elements, the boundary display determining unit 103 determines the display positions in such a way that the display elements will be displayed in boundary display mode. Then it enters the determined display positions in the "display position" column of the display position management table 10 as shown in FIG. 4B. In this description, the display position of display element 1 is determined such that the upper left apex of display element 1 will be located −10 pixels to the right (i.e., 10 pixels to the left) and 0 pixels to the bottom from the upper left apex of the HMD's display range. Similarly, display element 2 is determined to be displayed at a position 70 pixels to the right and 0 pixels to the bottom, display element 3 is determined to be displayed at a position −10 pixels to the right and 50 pixels to the bottom, and display element 4 is determined to be displayed at a position 70 pixels to the right and 50 pixels to the bottom. Consequently, the display elements are displayed in boundary display mode as shown in FIG. 4A.

In this way, to determine positions where display elements will be displayed in boundary display mode, if the HMD display area and display elements are rectangular, all that is necessary is to determine the horizontal positions of the display elements in such a way that boundaries of the display area will fit between left and right ends of the display elements or determine the vertical positions of the display elements in such a way that boundaries of the display area will fit between upper and lower ends of the display elements. Incidentally, after display positions are determined by the boundary display determining unit 103, the display unit 109 may display the display elements before going to operation in S103.

(S103) The display position changing unit 105 changes the display position of each display element according to the amount of head movement detected by the detection unit 104. Then, the flow goes to operation in S104. In this description, it is assumed that the amount of head movement is detected by an angular velocity sensor mounted on the head. The angular velocity sensor provides vertical and horizontal angular displacements. Upon obtaining the amounts of angular displacements via the detection unit 104, the display position changing unit 105 converts the amounts of angular displacements according to pixel pitch of the display unit 109. For example, if the display range of the HMD is 100 pixels wide and has a horizontal viewing angle of 50 degrees, a conversion constant for conversion from the amount of angular displacement to pixels is −2, which is determined using a formula "the pixel count in the width of the display range/horizontal viewing angle×(−1)", where the multiplier (−1) is used to reverse the direction. For example, if the display position changing unit 105 obtains 10 degrees as the amount of angular displacement of the head in the right direction, it moves the display element −20 pixels to the right, where the value "−20" is obtained by multiplying 10 by the conversion constant of −20. That is, when the user turns his/her head 10 degrees to the right, the display element is moved 20 degrees to the left.

Figures 5A, 5B:
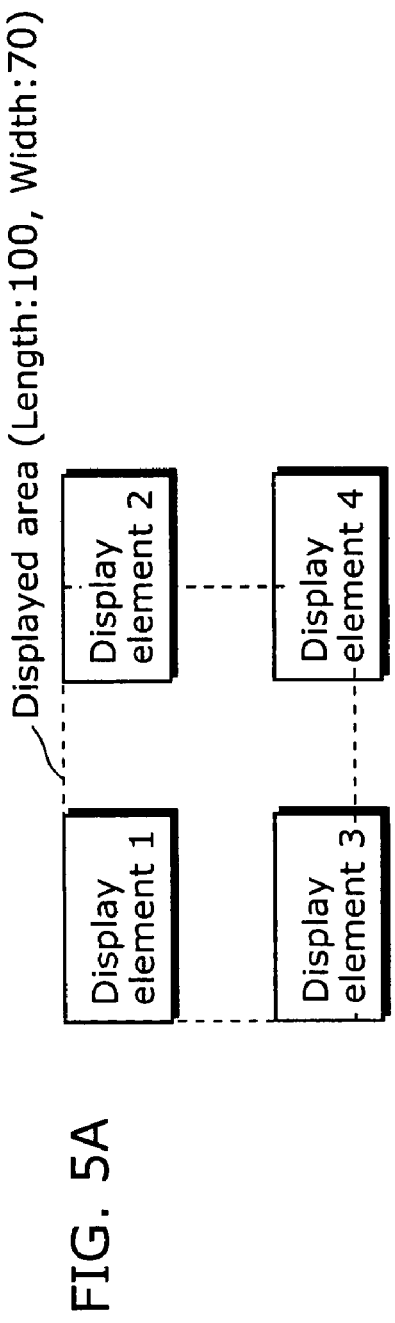
Figures 6A, 6B:
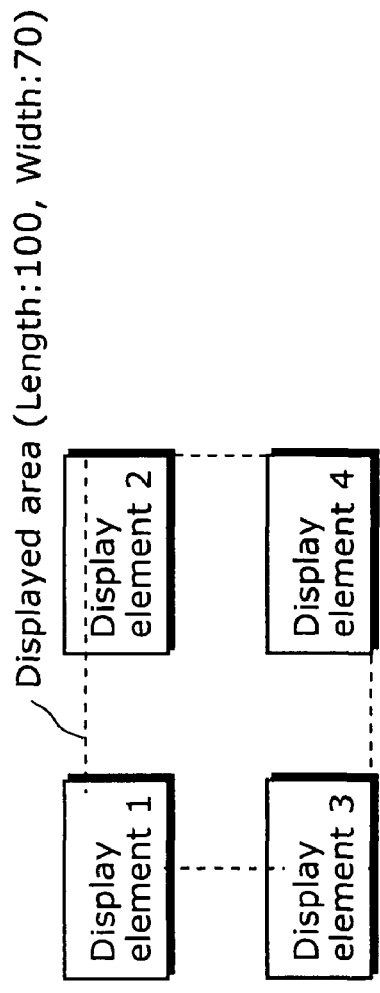

FIGS. 5A and 6A are diagrams showing display examples according to the first embodiment of the present invention. FIGS. 5B and 6B are diagrams showing the display position management table 10 according to the first embodiment of the present invention. FIGS. 5 and 6 are similar to FIG. 4 except that different scenes are assumed.

Specifically, in FIG. 4, it is assumed that the amount of angular displacement of the head is 0 degrees. In FIG. 5, it is assumed that the amount of angular displacement in the right direction is −5 degrees and that the display element is moved 10 pixels to the right. In FIG. 6, it is assumed that the amount of angular displacement is 10 degrees in the right direction and 5 degrees in the downward direction with respect to FIG. 5 and that the display element is moved −20 pixels to the right and −10 pixels downward. In this way, the display position changing unit 105 obtains the display position management table 10 from the boundary display determining unit 103 and changes the display positions by adding the determined amount of head travel to the display positions contained in the "display position" column of the display position management table 10.

Incidentally, although in this description, the conversion constant is fixed at −2, depending on the shape and pixel pitch of the display unit 109, the conversion constant may be determined separately according to the display area instead of using a fixed value. Also, regarding the amount of travel of display elements, it may be determined by a method other than the one which uses the pixel count obtained by multiplying the amount of angular displacement by a conversion constant as the amount of travel. For example, available methods include one which does not move display elements if angular displacement is within a certain range and one which increases the amount of travel of a display elements in the case of an abrupt angular displacement.

Incidentally, if display elements are moved according to the amount of head movement, display elements may fall completely outside the display area. To avoid a problem situation in which display elements get out of the user's view in this way, the display elements may be kept from moving more than a certain amount.

Although it is assumed here that the amount of travel is identical among all the four display elements, the amount of travel may vary from one display element to another.

Incidentally, after the display position changing unit 105 changes display position, the display unit 109 may display the display elements before going to the operation in S104.

(S104) The boundary display judging unit 106 judges whether each display element is displayed in boundary display mode. Then, the flow goes to operation in S105. The boundary display judging unit 106 obtains the display position management table 10 from the display position changing unit 105 and enters a value of either "boundary display" or "full display" in the "boundary display status" column of the display position management table 10. In this description, as shown in FIG. 4 to 6, "full display" is entered if the display element is displayed fully and "boundary display" is entered if the display element is displayed in boundary display mode.

Incidentally, even if a display element is displayed partially at an edge of the screen, if the edge of the screen moves toward the center of the user's visual field along with movement of the user's head toward the edge, it may be determined that the display element is not in boundary display mode.

(S105) The selected-element judging unit 107 judges the selection status of each display element. Then, the flow goes to operation in S106. The selected-element judging unit 107 obtains the display position management table 10 from the boundary display judging unit 106 and enters a value of either "selected" or "non-selected" in the "selection status" column of the display position management table 10. In this description, as shown in FIG. 4 to 6, "non-selected" is entered if the boundary display status of the display element is "boundary display" and "selected" is entered in the case of "full display".

(S106) The execution unit 108 changes the display on the display unit 109 according to the selection status of each display element. Then, the flow goes to operation in S107. In this description, the display element whose selection status is "selected" starts to be played back while the display element whose selection status is "non-selected" stops being played back. This makes it possible to play back only the display element (moving image) watched by the user.

(S107) The execution unit 108 judges whether the operation should be finished. If it is determined that the operation should be finished, the execution unit 108 goes to operation in S108. If it is determined that the operation should not be finished, the execution unit 108 goes to the operation in S101.

(S108) The operation is finished.

Description will be given below citing concrete examples.

Figure 7C:
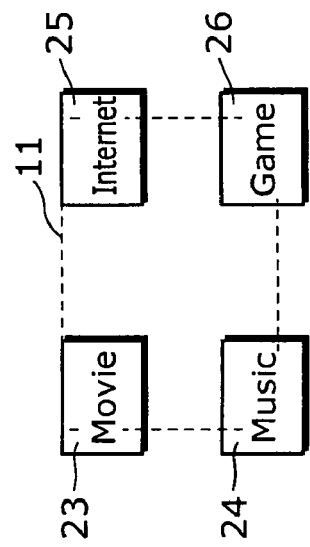
FIGS. 7A to 7C are diagrams showing a state transition on a display unit according to the first embodiment of the present invention.
Figure 7B:
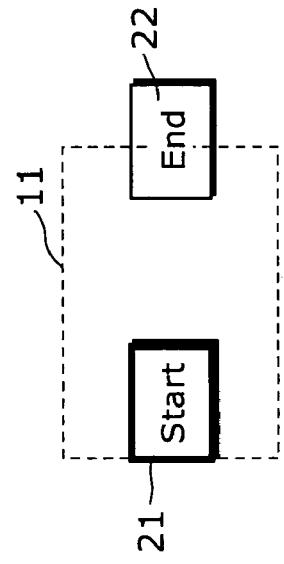
Figure 7A:
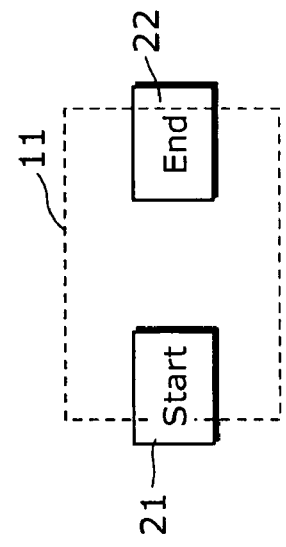

FIGS. 7A to 7C are diagrams showing a state transition on a display unit 109 according to the first embodiment of the present invention. A start button 21, which is an example of display elements, is used to give a command to start any process. An end button 22, which is an example of display elements, is used to give a command to finish using the apparatus. The rectangular dotted line in the figure represents a display area 11 of the display unit 109.

In an initial state, as shown in FIG. 7A, part of the start button 21 is displayed outside the display area 11, and so is part of the end button 22. In this state, the user cannot see that part of the start button 21, and neither can he/she see that part of the end button 22. Here, if the user wants to give a command to start any process, the head of the user turns to the left automatically. Consequently, the start button 21 and end button 22 move in the direction (rightward) approximately opposite to the direction (leftward) of head orientation change. When the entire start button 21 consequently fits in the display area 11 as shown in FIG. 7B, the start button 21 is selected. When the start button 21 is selected in this way, a movie button 23, music button 24, Internet button 25, and game button 26 (hereinafter these buttons will sometimes be referred to collectively as "sub-menu buttons") are displayed as shown in FIG. 7C. Part of the sub-menu buttons are displayed outside the display area 11. In this state, the user cannot see that part of the sub-menu buttons.

Figure 8A:
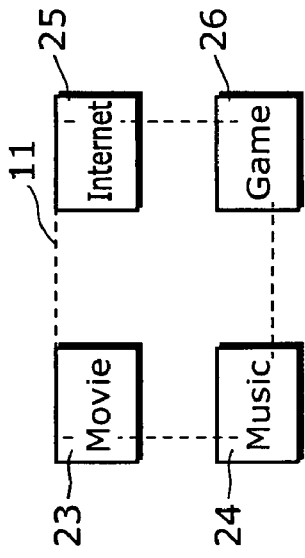
FIGS. 8A to 8C are diagrams showing another state transition on the display unit according to the first embodiment of the present invention.
Figure 8B:
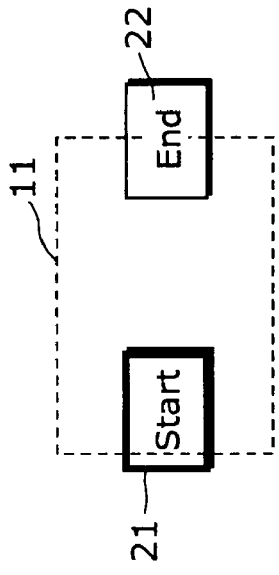
Figure 8C:
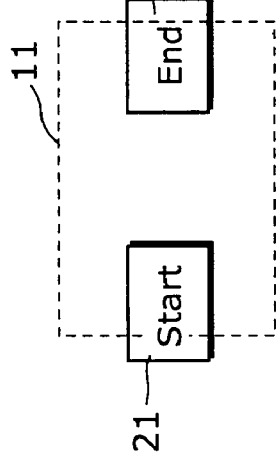

FIGS. 8A to 8C are diagrams showing another state transition on the display unit 109 according to the first embodiment of the present invention. Whereas FIG. 7 illustrates a form in which the start button 21 is selected when it fits entirely in the display area 11, FIG. 8 illustrates a form in which the start button 21 is selected when a predetermined percentage (e.g., 90%) or more of the start button 21 fits in the display area 11.

That is, in the initial state, as shown in FIG. 8A, part of the start button 21 is displayed outside the display area 11, and so is part of the end button 22. In this state, the user cannot see that part of the start button 21, and neither can he/she see that part of the end button 22. Here, if the user wants to give a command to start any process, the head of the user turns to the left automatically. Consequently, the start button 21 and end button 22 move in the direction (rightward) approximately opposite to the direction (leftward) of head orientation change. When 90% or more of the start button 21 consequently fits in the display area 11 as shown in FIG. 8B, the start button 21 is selected. When the start button 21 is selected in this way, the sub-menu buttons are displayed as shown in FIG. 8C. Part of the sub-menu buttons are displayed outside the display area 11. In this state, the user cannot see that part of the sub-menu buttons.

FIGS. 9A to 9C are diagrams showing another state transition on the display unit 109 according to the first embodiment of the present invention. The rectangular dotted line in the figure represents the display area 11 of the display unit 109 and the elliptical dotted line in the figure represents the visual field 12 of the user. Whereas FIG. 7 illustrates a form in which the display positions of display elements are determined in such a way as to cross a boundary line of the display area 11, FIG. 8 illustrates a form in which the display positions of display elements are determined in such a way as to cross a boundary line of the user's visual field 12. Whether a display element crosses a boundary line of the display area 11 or boundary line of the user's visual field 12, both cases are the same in that the user cannot see the entire display element.

That is, in the initial state, as shown in FIG. 9A, part of the start button 21 is displayed outside the user's visual field 12, and so is part of the end button 22. In this state, the user cannot see that part of the start button 21, and neither can he/she see that part of the end button 22. Here, if the user wants to give a command to start any process, the head of the user turns to the left automatically. Consequently, the start button 21 and end button 22 move in the direction (rightward) approximately opposite to the direction (leftward) of head orientation change. When the entire start button 21 consequently fits in the user's visual field 12 as shown in FIG. 9B, the start button 21 is selected. When the start button 21 is selected in this way, the sub-menu buttons are displayed as shown in FIG. 9C. Part of the sub-menu buttons are displayed outside the user's visual field 12. In this state, the user cannot see that part of the sub-menu buttons.

Figure 10A:
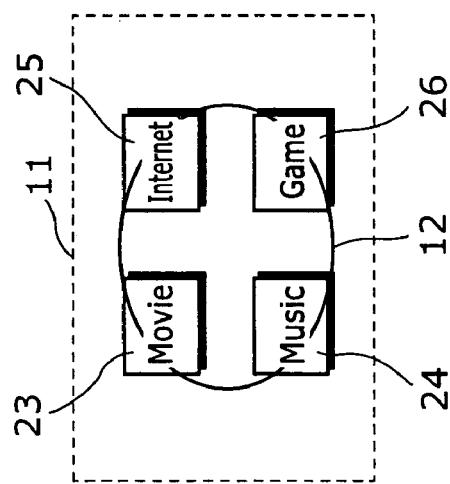
FIGS. 10A to 10C are diagrams showing another state transition on the display unit according to the first embodiment of the present invention.
Figure 10B:
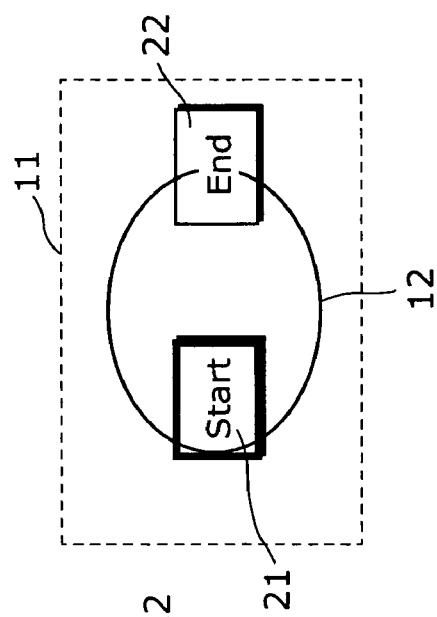
Figure 10C:
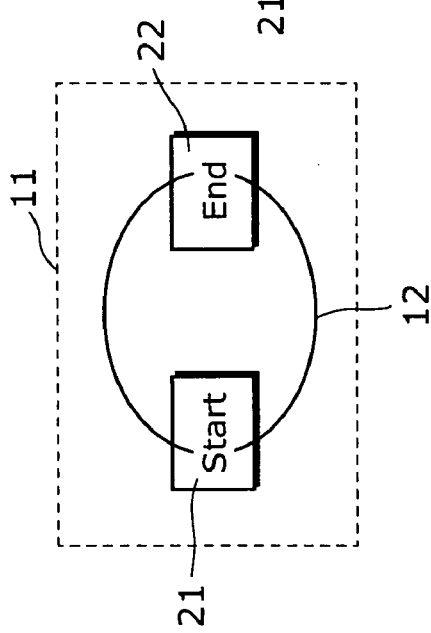

FIGS. 10A to 10C are diagrams showing another state transition on the display unit 109 according to the first embodiment of the present invention. Whereas FIG. 9 illustrates a form in which the start button 21 is selected when it fits entirely in the user's visual field 12, FIG. 10 illustrates a form in which the start button 21 is selected when a predetermined percentage (e.g., 90%) or more of the start button 21 fits in the user's visual field 12.

That is, in the initial state, as shown in FIG. 10A, part of the start button 21 is displayed outside the user's visual field 12, and so is part of the end button 22. In this state, the user cannot see that part of the start button 21, and neither can he/she see that part of the end button 22. Here, if the user wants to give a command to start any process, the head of the user turns to the left automatically. Consequently, the start button 21 and end button 22 move in the direction (rightward) approximately opposite to the direction (leftward) of head orientation change. When 90% or more of the start button 21 consequently fits in the user's visual field 12 as shown in FIG. 10B, the start button 21 is selected. When the start button 21 is selected in this way, the sub-menu buttons are displayed as shown in FIG. 10C. Part of the sub-menu buttons are displayed outside the user's visual field 12. In this state, the user cannot see that part of the sub-menu buttons.

FIGS. 11A to 11F are diagrams showing another state transition on the display unit 109 according to the first embodiment of the present invention. Here, description will be given of a state transition which takes place after the sub-menu buttons are displayed. The sub-menu buttons are examples of display elements according to the present invention. Specifically, they include the movie button 23, music button 24, Internet button 25, and game button 26.

Figure 11A:
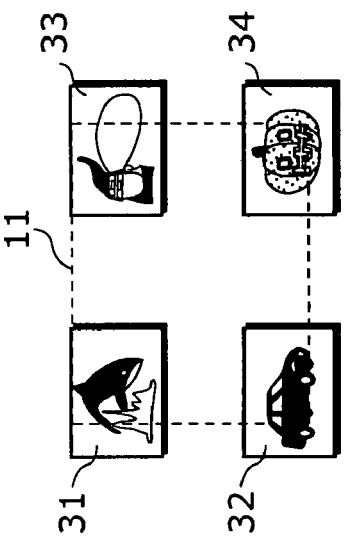
FIGS. 11A to 11F are diagrams showing another state transition on the display unit according to the first embodiment of the present invention.
Figure 11B:
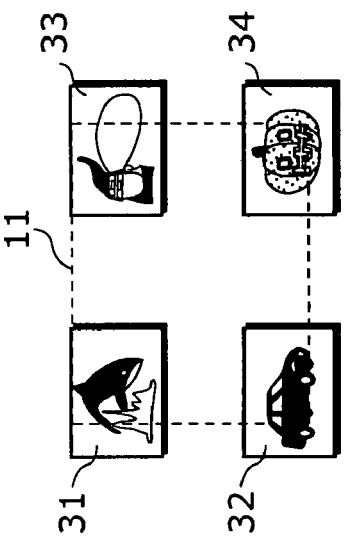
Figure 11C:
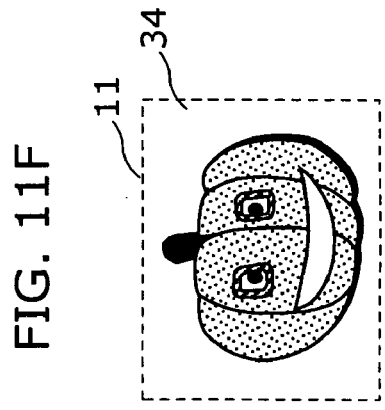
Figure 11D:
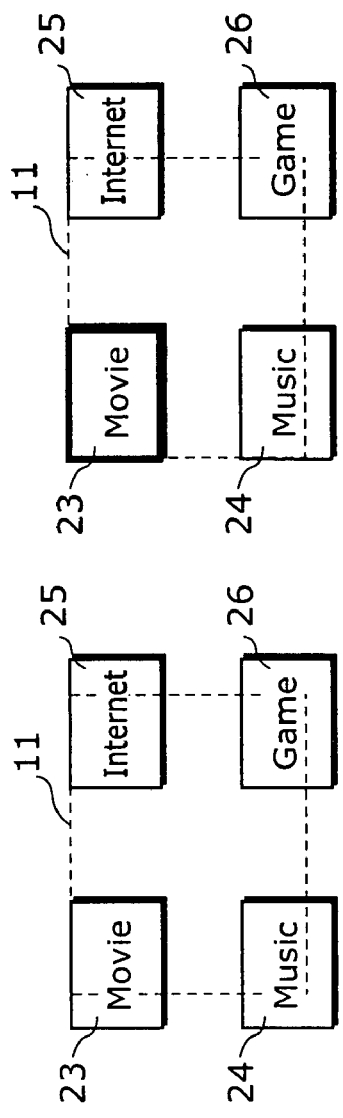
Figure 11E:
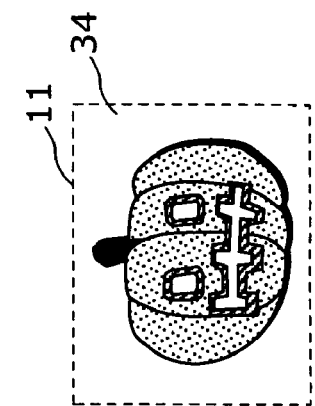
Figure 11F:
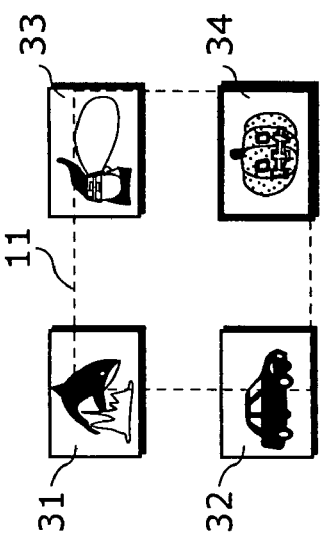

As described earlier, just after the start button 21 is selected, the user cannot see part of the sub-menu buttons as shown in FIG. 11A. Here, if the user wants to view a movie, the head of the user turns to the upper left automatically. Consequently, the sub-menu buttons move in the direction (lower right) approximately opposite to the direction (upper left) of head orientation change. When the entire movie button 23 consequently fits in the display area 11 as shown in FIG. 11B, the movie button 23 is selected. When the movie button 23 is selected in this way, moving images 31 to 34 in suspension are displayed as shown in FIG. 11C. Part of the moving images 31 to 34 are displayed outside the display area 11. In this state, the user cannot see that part of the moving images 31 to 34. Here, if the user wants to view the moving image 34, the head of the user turns to the lower right automatically. Consequently, the moving images 31 to 34 move in the direction (upper left) approximately opposite to the direction (lower right) of head orientation change. When the entire moving image 34 consequently fits in the display area 11 as shown in FIG. 11D, the moving image 34 is selected. When the moving image 34 is selected in this way, the moving image 34 is displayed, for example, in the display area 11 as shown in FIG. 11E and starts to be played back as shown in FIG. 11F.

FIGS. 12A to 12F are diagrams showing another state transition on the display unit 109 according to the first embodiment of the present invention. In the example of FIG. 7, once the user enters a sub-menu, the user can no longer return to a main menu. The sub-menu here is a menu consisting of the sub-menu buttons while the main menu is a menu consisting of the start button 21 and end button 22. However, a button may be selected by mistake and it is inconvenient to be unable to return to the previous menu in such a case. Here, description will be given of a form in which it is possible to return to the main menu even after going to a sub-menu button as required.

That is, in the initial state, as shown in FIG. 12A, part of the start button 21 is displayed outside the display area 11, and so is part of the end button 22. In this state, the user cannot see that part of the start button 21, and neither can he/she see that part of the end button 22. Here, if the user wants to give a command to start any process, the head of the user turns to the left automatically. Consequently, the start button 21 and end button 22 move in the direction (rightward) approximately opposite to the direction (leftward) of head orientation change. When the entire start button 21 consequently fits in the display area 11 as shown in FIG. 12B and then moves to the approximate center of the display area 11 as shown in FIG. 12C, the start button 21 is selected. When the start button 21 is selected in this way, the sub-menu buttons are displayed radially around the start button 21 as shown in FIG. 12D. Part of the sub-menu buttons are displayed outside the display area 11. In this state, the user cannot see that part of the sub-menu buttons.

Here, if the user wants to view a movie, the head of the user turns to the upper left automatically. Consequently, the sub-menu buttons move in the direction (lower right) approximately opposite to the direction (upper left) of head orientation change. When the entire movie button 23 consequently fits in the display area 11 as shown in FIG. 12D, the movie button 23 is selected. On the other hand, in the state shown in FIG. 12D, if the user wants to give a command to finish any process, the head of the user turns to the right automatically. Consequently, the sub-menu buttons, start button 21, and end button 22 move in the direction (leftward) approximately opposite to the direction (rightward) of head orientation change. When the entire end button 22 consequently fits in the display area 11 as shown in FIG. 12F, the end button 22 is selected. Of course, the timing for selecting the end button 22 does not have to coincide with a time when the entire end button 22 fits in the display area 11. For example, the end button 22 may be selected when 90% or more of the end button 22 fits in the display area 11 or when the end button 22 moves to the approximate center of the display area 11.

As described above, with the display apparatus according to the first embodiment of the present invention, since the user cannot see part of a display element, when the user looks at the display element, the user's head moves automatically. Consequently, the display element displayed in the direction of head orientation change is selected and a predetermined process related to the selected display element is executed. This enables high-accuracy, hands-free operation while adopting a low-cost configuration which only needs to detect the direction of head orientation change. For example, when four moving images ("display element 1", "display element 2", "display element 3", and "display element 4", respectively) are displayed all at once as four display elements on an HMD, of the four moving images being displayed, one moving image being watched by the user can be placed in a playback state while placing the other three moving images which are not being watched by the user in a pause state.

Incidentally, the operations in S101 to S105 shown in FIG. 3 may be performed in any order. For example, display elements may be obtained before determining the elements to be displayed actually or boundary display position may be determined before determining display elements. Also, when each step is executed repeatedly, if there is a step which uses previous processing results, there is no need to perform any process in this step. For example, when reexecuting S101 after executing S108, there is no need to particularly change display elements. Furthermore, the operations shown in FIG. 3 may be performed immediately in sequence, after a while, or in parallel.

Also, the operations in S101 to S108 shown in FIG. 3 may produce processing results which involve probabilities. For example, a display element may be judged, in terms of the boundary display status, as being "displayed in boundary display mode with a probability of 20%" or judged, in terms of the selection status, as being "selected with a probability of 15%".

Also, although it has been stated that a display element is selected when it fits in the display area 11, the present invention is not limited to this. Specifically, a display element may be selected when it fits in a selection frame as described below.

FIGS. 13A to 13C are diagrams showing a display example when a selection frame F is provided. The selection frame F is used to select a display element. That is, the display unit 109 displays the selection frame F in a predetermined position (e.g., center) of the display area 11 as shown in FIG. 13A. The display position of the selection frame F is fixed.

Here, if the user turns his/her head to the left, the start button 21 and end button 22 move in the direction (rightward) approximately opposite to the direction (leftward) of head orientation change as shown in FIG. 13B. When the entire start button 21 consequently fits in the selection frame F as shown in FIG. 13C, the start button 21 is selected.

In this way, a configuration which uses the selection frame F offers effects similar to those described above. Moreover, it has the effect of improving ease of use because a display element can be selected using the selection frame F which is an easy-to-understand means.

Incidentally, although it has been stated here that the start button 21 is selected when the entire start button 21 fits in the selection frame F, the timing for selecting a display element is not limited to this. Specifically, the start button 21 may be selected when a predetermined percentage or more of the start button 21 fits in the selection frame F.

Figure 14C:
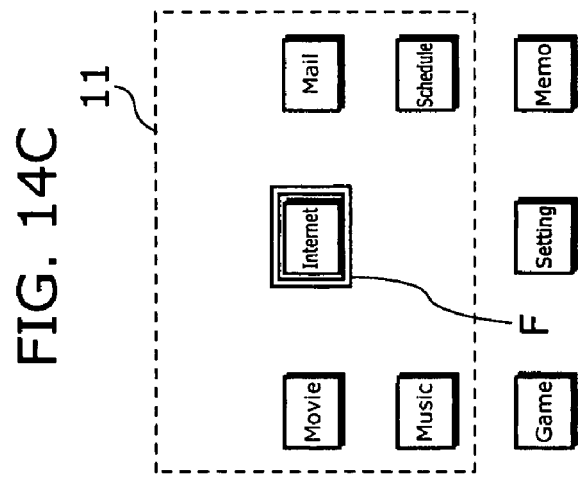
FIGS. 14A to 14C are diagrams showing another display example when a selection frame is provided.
Figure 14B:
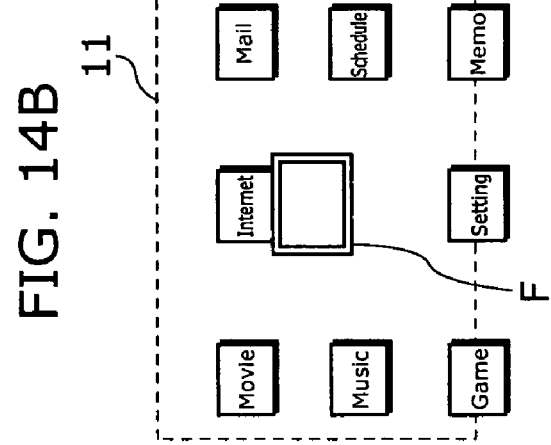
Figure 14A:
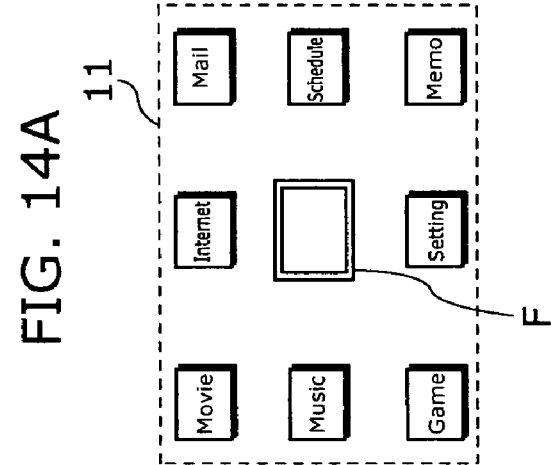

FIGS. 14A to 14C are diagrams showing another display example when a selection frame F is provided. Whereas FIG. 13 illustrates a case in which one display element is selected out of two display elements, FIG. 14 illustrates a case in which one display element is selected from among a large number of display elements. In this case, it is necessary to avoid a problem situation in which two or more display elements fit in a selection frame F. Thus, preferably the selection frame F is large enough to contain one display element, but not large enough to contain two or more display elements. The use of such a selection frame F makes it possible to select one display element among a large number of display elements in a simple manner.

Incidentally, although a rectangular selection frame F is illustrated here, the shape of the selection frame F is not specifically limited. For example, a circular selection frame F may be adopted. The color of the selection frame F is not specifically limited either. For example, a transparent selection frame F may be adopted.

Also, a color or pattern may be added to one or both of inner and outer areas of the selection frame F. In that case, boundary lines of the color or pattern may be regarded to be the selection frame F. By reducing the transparency of the color or pattern, it is possible to hide the inner and outer area from the user's view.

Second Embodiment

Whereas in the first embodiment, an HMD has been illustrated as an example of a display apparatus, a large-screen TV will be illustrated as an example of a display apparatus in the second embodiment. The second embodiment will be described, focusing on differences from the first embodiment.

Figure 15:
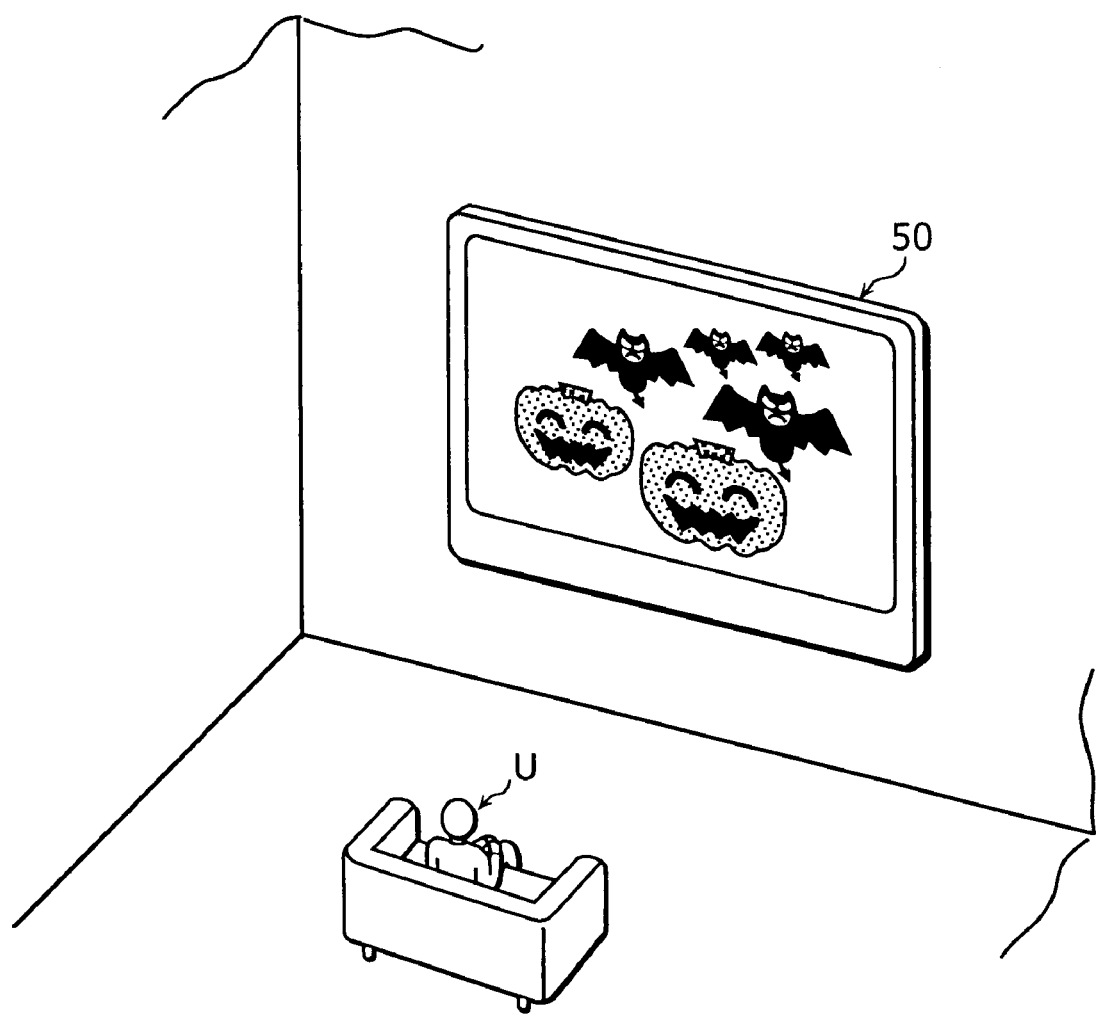
FIG. 15 is a diagram showing how a display apparatus according to a second embodiment of the present invention is used.

FIG. 15 is a diagram showing how a display apparatus according to the second embodiment of the present invention is used. A large-screen TV 50 is an example of the display apparatus according to the present invention. A user U watches a movie displayed on the TV 50. The TV 50 can be operated in a hands-free manner.

Figure 16:
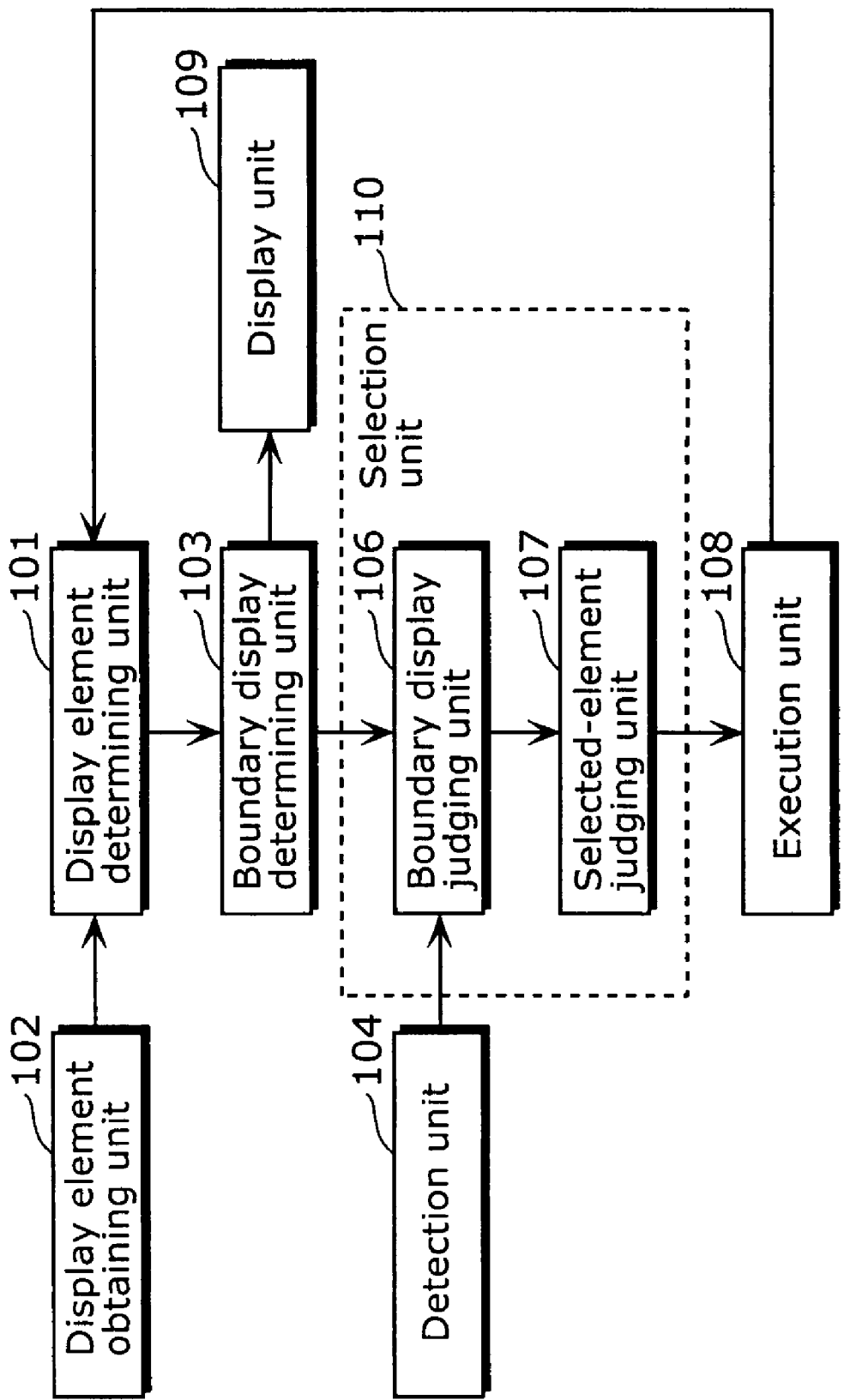
FIG. 16 is a block diagram of the display apparatus according to the second embodiment of the present invention.

FIG. 16 is a block diagram of the display apparatus according to the second embodiment of the present invention. This display apparatus is a stationary display apparatus (e.g., TV 50). Functionally, it includes a display element determining unit 101, display element obtaining unit 102, boundary display determining unit 103, detection unit 104, selection unit 110, execution unit 108, and display unit 109.

The display unit 109 according to the second embodiment is not mounted on the head of the user U, but installed on a wall or the like in a room. Thus, the display apparatus according to the second embodiment is not equipped with a display position changing unit 105 such as that of the first embodiment. The reason why there is no need for the display position changing unit 105 will be described in detail later. In other respects, the second embodiment is similar to the first embodiment.

Incidentally, the display type of the display unit 109 is not specifically limited, and may be a liquid crystal type or plasma type. Although not illustrated, it is assumed that an angular velocity sensor (detection unit 104) is mounted on the head of the user U.

Figure 17:
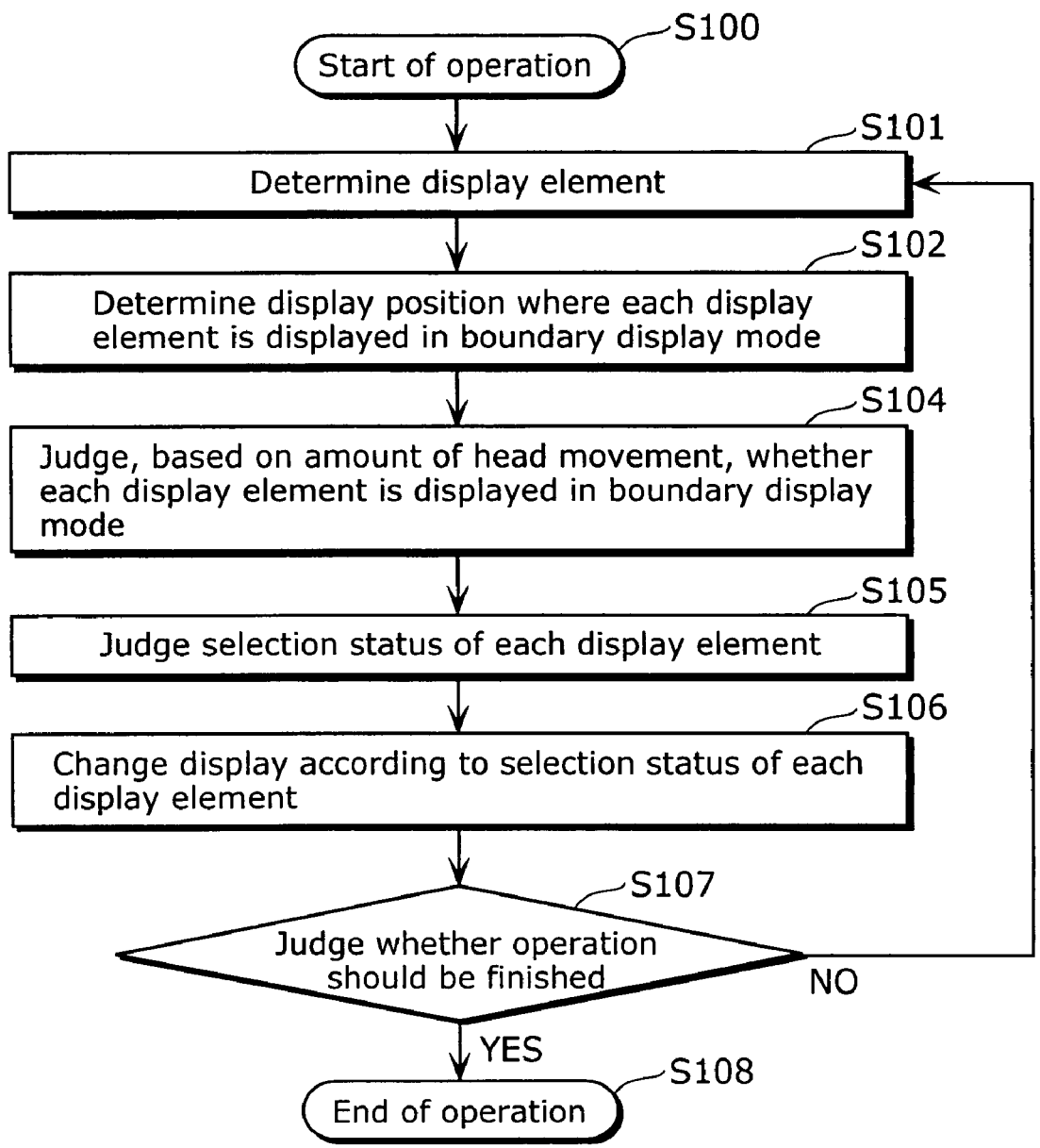
FIG. 17 is a diagram showing operation of the display apparatus according to the second embodiment of the present invention.

FIG. 17 is a diagram showing operation of the display apparatus according to the second embodiment of the present invention. As described above, the display apparatus according to the second embodiment is not equipped with a display position changing unit 105 such as that of the first embodiment. Consequently, the display apparatus according to the second embodiment does not need operation (operation which corresponds to S103 in FIG. 3) of a display position changing unit 105 such as that of the first embodiment. In other respects, the second embodiment is similar to the first embodiment.

Figure 18A:
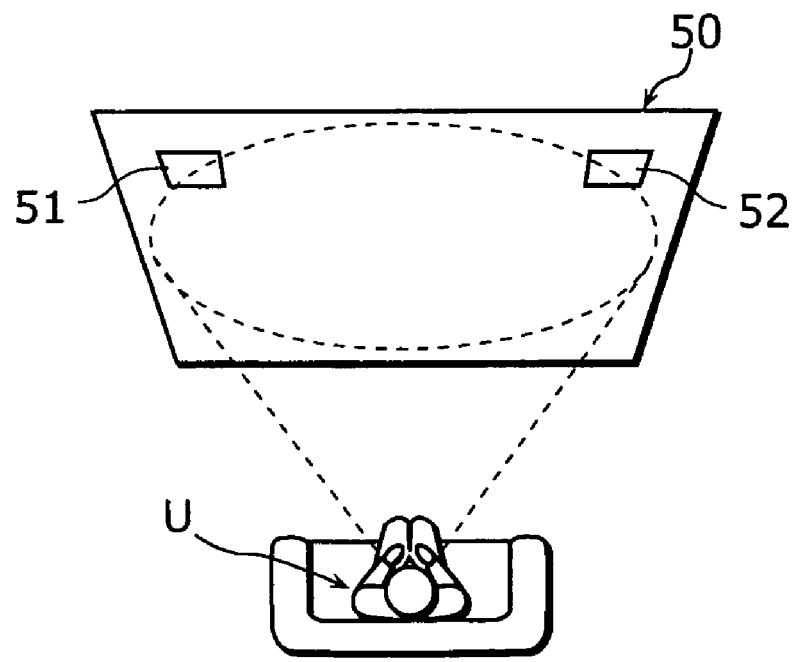
FIGS. 18A and 18B are diagrams showing a state transition on a display unit according to the second embodiment of the present invention.
Figure 18B:
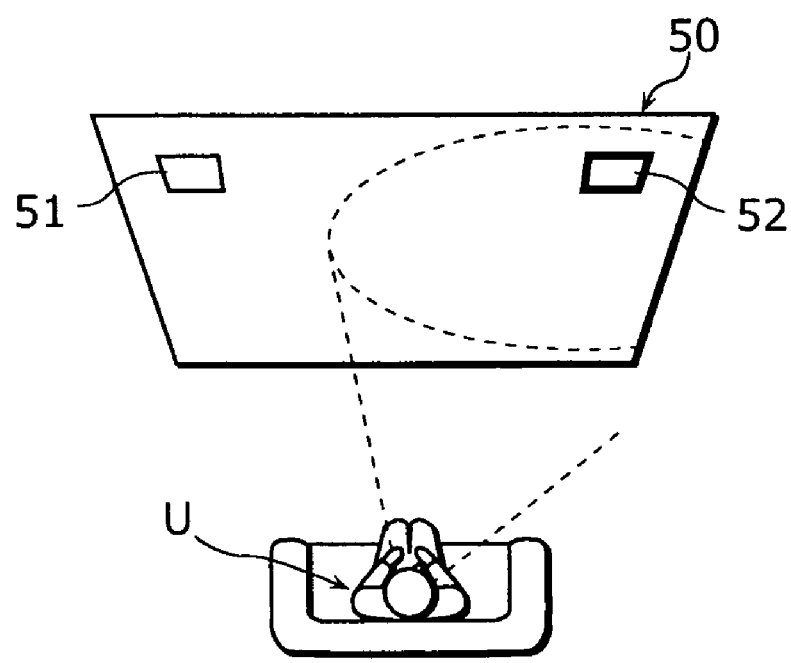

FIGS. 18A and 18B are diagrams showing a state transition on the display unit 109 according to the second embodiment of the present invention. A button 51, which is an example of display elements, is used to turn down the volume on the TV 50. A button 52, which is an example of display elements, is used to turn up the volume on the TV 50.

The area indicated by dotted lines in the figure represents boundary lines of the central visual field of the user U. As shown in FIG. 18A, when the user U is looking straight ahead, the buttons 51 and 52 are displayed across a boundary line of the central visual field of the user U. In this case, the TV 50 must keep track of viewing position of the user U, but the method for that is not specifically limited. For example, viewing position of the user U can be determined by analyzing video shot by a camera installed in the room.

In the state shown in FIG. 18A, the user U can see part of the buttons 51 and 52 vaguely. Now, if the user U wants to turn up the volume on the TV 50, the head of the user moves automatically to the right in an attempt to see details of the entire button 52. When the entire button 52 consequently fits in the visual field of the user U as shown in FIG. 18B, the button 52 is selected.

Again, with the second embodiment, since the user cannot see part of a display element, when the user looks at the display element, the user's head moves automatically as described above. This enables high-accuracy, hands-free operation while adopting a low-cost configuration which only needs to detect the direction of head orientation change. In other words, the present invention is also applicable to stationary display apparatus.

Incidentally, the second embodiment illustrates only a case in which display elements are placed across a boundary line of the user's central visual field, but not a case in which display elements are placed across a boundary line of a display area. This is because when a stationary display apparatus is used, even if display elements are placed across a boundary line of a display area, the user's head cannot be expected to move automatically. This will be described in detail below.

FIGS. 19A and 19B are diagrams conceptually showing a display area visible to a user U wearing an HMD. It is assumed here that the user U is viewing a display area 11 ahead slightly on the left as shown in FIG. 19A.

In this case, even if the head of the user U moves, relative position of the display area 11 does not change, as shown in FIG. 19B. Thus, according to the first embodiment, the display position changing unit 105 makes the display elements in the display area 11 change like a view seen from a window 11. Consequently, when the user U wants to select a display element placed across a boundary line of the display area 11, the head of the user U automatically turns in the direction of the display element.

In contrast, with a stationary display apparatus, when the head of the user U moves, relative position of the TV 50 moves accordingly as shown in FIG. 18. In other words, the user U is viewing only a natural image in this case. Consequently, there is no need for the display apparatus to change the display positions of display elements. This eliminates the need for a display position changing unit 105. With a configuration without a display position changing unit 105, the display positions of display elements remain unchanged even if the head is moved. Thus, even if there is a display element placed across a boundary line of the display area 11, the head of the user U is less liable to move automatically to select the display element.

Incidentally, although in the second embodiment, an angular velocity sensor mounted on the head of the user U has been illustrated as a detection unit 104, any detection unit 104 may be used as long as it can detect movements of the head of the user U. For example, movements of the head of the user U can be detected by analyzing video shot by a camera installed in the room. This has the advantage of increased convenience because there is no need to mount anything on the head of the user U.

Incidentally, the embodiments described above are implemented as predetermined programs stored in a storage device (ROM, RAM, hard disk, or the like) and capable of carrying out the processing procedures described above are interpreted and executed by a CPU. In this case, program data may be installed on the storage device through a recording medium or executed directly from the recording medium. Incidentally, examples of the recording medium include semiconductor memories such as a ROM, RAM, and flash memory; magnetic disk memories such as a flexible disk and hard disk; optical disks such as a CD-ROM, DVD, and BD; and memory cards such as an SD card. Also, the recording medium is a concept which includes communications media such as telephone lines and transmission paths.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to HMDs, FMDS, HUDs, glass type displays, large-screen TVs, and the like which require high-accuracy, hands-free operation while adopting a low-cost configuration.

What is claimed is:

1. A display apparatus which displays information to a user, said display apparatus comprising:
   an obtainment unit operable to obtain an icon, the icon being information to be displayed to the user;
   a determining unit operable to determine a display position of the obtained icon at which a portion of the obtained icon cannot be seen by the user;
   a display unit operable to display the icon at the determined display position;
   a detection unit operable to detect a direction of change when an orientation of the user's head is changed;
   a selection unit operable to select the icon to be displayed in the detected direction of change;

an execution unit operable to execute a predetermined process related to the selected icon; and a changing unit operable to change the display position of the icon so that the icon moves in a direction approximately opposite to the detected direction of change, wherein said display unit is operable to display the icon at the changed display position, wherein said selection unit selects the icon to be displayed when a predetermined percentage or more of the icon fits in a display area that can be seen by the user, wherein said selection unit does not select the icon to be displayed unless the predetermined percentage or more of the icon fits in the display area that can be seen by the user, and wherein said execution unit is operable to immediately execute a function related to the icon when said selection unit selects the icon.

2. The display apparatus according to claim 1, wherein said selection unit is operable to select the icon when the entire icon is brought into view of the user.

3. The display apparatus according to claim 1, wherein said selection unit is operable to select the icon when a predetermined display condition continues for a predetermined time or longer.

4. The display apparatus according to claim 1, wherein said determining unit is operable to determine the display position of the icon such that the icon crosses a boundary line of a visual field of the user.

5. The display apparatus according to claim 1, wherein said determining unit is operable to determine the display position of the icon such that the icon crosses a boundary line of a display area of said display unit.

6. The display apparatus according to claim 1, wherein said determining unit is operable to determine the display position of the icon such that: part of a right end of the icon is displayed at a left end of a display area of the display unit; part of a left end of the icon is displayed at a right end of the display area of the display unit; part of a lower end of the icon is displayed at an upper end of the display area of the display unit; or part of an upper end of the icon is displayed at a lower end of the display area of the display unit.

7. The display apparatus according to claim 1, wherein when display positions of a plurality of icons are changed, said determining unit is operable to determine the display positions of the plurality of icons so that one of the icons is selected.

8. The display apparatus according to claim 1, wherein said detection unit is operable to detect the direction of change based on output from an angular velocity sensor mounted on the head of the user.

9. The display apparatus according to claim 1, wherein when the icon is a button, said execution unit is operable to execute a process assigned to the button.

10. The display apparatus according to claim 1, wherein when the icon is a moving image, said execution unit is operable to start playing back the moving image.

11. The display apparatus according to claim 1, wherein said display unit is operable to display a selection frame at a predetermined display position, the selection frame being a frame used to select the icon, and said selection unit is operable to select the icon when the icon fits in the selection frame.

12. The display apparatus according to claim 1, wherein said display unit is mounted on the head of the user.

13. A control method for a display apparatus which displays information to a user, comprising:

obtaining a icon, the icon being information to be displayed to the user;

determining a display position of the obtained icon at which a portion of the obtained icon cannot be seen by the user;

displaying the icon at the determined display position;

detecting a direction of change when an orientation of the user's head is changed;

selecting the icon to be displayed in the detected direction of change;

executing a predetermined process related to the selected icon; and changing the display position of the icon so that the icon moves in a direction approximately opposite to the detected direction of change, wherein said displaying includes displaying the icon at the changed display position, wherein the icon to be displayed is selected by said selecting when a predetermined percentage or more of the icon fits in the display area that can be seen by the user, wherein the icon to be displayed is not selected by said selecting unless the predetermined percentage or more of the icon fits in the display area that can be seen by the user, and wherein said executing includes immediately executing a function related to the icon when the icon is selected in said selecting.

14. A non-transitory computer-readable recording medium on which a program for controlling a display apparatus which displays information to a user is recorded, wherein when executed, said program causes a computer to perform a method comprising:

obtaining a icon, the icon being information to be displayed to the user;

determining a display position of the obtained icon at which a portion of the obtained icon cannot be seen by the user;

displaying the icon at the determined display position;

detecting a direction of change when an orientation of the user's head is changed;

selecting the icon to be displayed in the detected direction of change;

executing a predetermined process related to the selected icon; and changing the display position of the icon so that the icon moves in a direction approximately opposite to the detected direction of change, wherein said displaying includes displaying the icon at the changed display position, wherein the icon to be displayed is selected by said selecting when a predetermined percentage or more of the icon fits in the display area that can be seen by the user, wherein the icon to be displayed is not selected by said selecting unless the predetermined percentage or more of the icon fits in the display area that can be seen by the user, and wherein said executing includes immediately executing a function related to the icon when the icon is selected in said selecting.

15. An integrated circuit for controlling a display apparatus which displays information to a user, comprising:

an obtainment unit operable to obtain a icon, the display element being information to be displayed to the user;

a determining unit operable to determine a display position of the obtained display element at which a portion of the obtained icon cannot be seen by the user;
a display unit operable to display the icon at the determined display position;
a detection unit operable to detect a direction of change when an orientation of the user's head is changed;
a selection unit operable to select the icon to be displayed in the detected direction of change;
an execution unit operable to execute a predetermined process related to the selected icon; and
a changing unit operable to change the display position of the icon so that the icon moves in a direction approximately opposite to the detected direction of change,
wherein said display unit is operable to display the icon at the changed display position,
wherein said selection unit selects the icon to be displayed when a predetermined percentage or more icon fits in a display area that can be seen by the user,
wherein said selection unit does not select the icon to be displayed unless the predetermined percentage or more of the icon fits in the display area that can be seen by the user, and
wherein said execution unit is operable to immediately execute a function related to the icon when said selection unit selects the icon.

* * * * *